United States Patent [19]

Tokioka et al.

[11] Patent Number: 5,684,277
[45] Date of Patent: Nov. 4, 1997

[54] COORDINATE INPUT APPARATUS

[75] Inventors: Masaki Tokioka, Fujisawa; Atsushi Tanaka, Kawasaki; Yuichiro Yoshimura, Kamakura; Ryozo Yanagisawa, Chiba-ken; Katsuyuki Kobayashi; Hajime Sato, both of Yokohama, all of Japan

[73] Assignee: Canon Kabushiki Kaisha, Tokyo, Japan

[21] Appl. No.: 508,326

[22] Filed: Jul. 27, 1995

[30] Foreign Application Priority Data

Jul. 29, 1994 [JP] Japan .................................. 6-177954

[51] Int. Cl.⁶ .............................. G08C 21/00; G09G 3/02
[52] U.S. Cl. .............................. 178/18; 178/19; 345/177; 345/179
[58] Field of Search .................... 178/18, 19, 20; 345/173, 174, 176, 177, 179

[56] References Cited

U.S. PATENT DOCUMENTS

| | | | |
|---|---|---|---|
| 4,980,518 | 12/1990 | Kobayashi | 178/18 |
| 5,484,967 | 1/1996 | Yanagisawa | 178/19 |
| 5,565,893 | 10/1996 | Sato | 345/177 |
| 5,570,299 | 10/1996 | Takioka | 178/18 |

FOREIGN PATENT DOCUMENTS

| | | |
|---|---|---|
| 0364983 | 4/1990 | European Pat. Off. . |
| 0585842 | 3/1994 | European Pat. Off. . |
| 58-16509 | 3/1983 | Japan . |

*Primary Examiner*—Curtis Kuntz
*Assistant Examiner*—Vijay Shankar
*Attorney, Agent, or Firm*—Fitzpatrick, Cella, Harper & Scinto

[57] ABSTRACT

A coordinate input apparatus which can attain an accurate coordinate input operation, includes a sensor for detecting an input variation. The vibration is amplified, and an envelope detection circuit generates the envelope of the amplified vibration. A gate signal generation circuit receives the envelope and a second-order differential signal of the envelope generated by an inflection point detection circuit. The gate signal generation circuit attenuates the envelope and adds a predetermined offset to the attenuated envelope. The gate signal generation circuit compares the sum signal with the second-order differential signal to generate a gate signal. In the duration of the gate signal, a tg comparator detects, as a group delay time, a time up to the zero cross point of the second-order differential signal, and a tp comparator detects, as a phase delay time, a time up to the zero cross point in a predetermined order of a phase signal. An arithmetic control circuit calculates the coordinate position of a vibration input source on the basis of these delay times.

12 Claims, 20 Drawing Sheets

GLASS THICKNESS ; d = 1.20 – 1.50 mm

PEN PRESSURE-LEVEL CHARACTERISTIC

COORDINATE INPUT APPARATUS

BACKGROUND OF THE INVENTION

1. Field of the Invention

The present invention relates to a coordinate input apparatus and, more particularly, to an apparatus which detects an elastic wave vibration input from a vibration pen by a plurality of sensors arranged on a vibration transmission plate, and detects the coordinate position of a vibration input point at which a vibration is input by the vibration pen on the basis of the transmission time of the elastic wave vibration input from the vibration pen to the vibration transmission plate.

2. Related Background Art

A coordinate input apparatus utilizing ultrasonic waves adopts a system for calculating the coordinate position of an input point by detecting the delay time of waves transmitted along a tablet as an input surface. Since no matrix electric line pattern or the like is formed on the tablet, a low-cost apparatus can be provided. When the tablet comprises a transparent glass plate, a coordinate input apparatus with higher transparency than other apparatuses can be realized.

Such a coordinate input apparatus normally has the following arrangement.

More specifically, the pen tip of a vibration pen is vibrated, and by touching the surface of a vibration transmission plate consisting of an acrylic or glass plate with the vibration pen, a position on the vibration transmission plate is designated.

The vibration pen is driven every predetermined period (e.g., every 5 msec), and simultaneously with the driving of the vibration, a time measurement operation using a timer (comprising a counter) is started. A vibration generated by the vibration pen is transmitted on the vibration transmission plate, and reaches a plurality of vibration sensors, such as piezoelectric elements, which are arranged near the positions inside the perimeter of the vibration transmission plate. Each sensor converts a mechanical vibration into an electrical signal, with delay times corresponding to the distances from the vibration pen.

The vibrations which are detected by the respective vibration sensors and are converted into electrical signals are then subjected to waveform detection processing by a signal waveform detection circuit, thereby generating signals indicating the vibration arrival timings to the respective vibration sensors. Based on these signals, the measurement values of the timer, which has started counting simultaneously with the driving of the vibration pen, i.e., the delay times of the vibration transmission, are read, and a predetermined calculation is made using these times, thus calculating the coordinate position of the vibration pen on the vibration transmission plate. The calculated coordinate position information is output to an external apparatus.

The principle of measuring the vibration transmission time from the vibration pen to each vibration sensor will be described below.

FIG. 15 is a chart for explaining the detected waveform input to the signal waveform detection circuit and time measurement processing of the vibration transmission time based on the waveform. The processing for only one vibration sensor will be explained below, and the same applies to other vibration sensors.

The measurement of the vibration transmission time to the vibration sensor is started simultaneously with the driving of the vibration pen, as described above. At this time, a driving signal 41 is applied to the vibration pen. An ultrasonic wave vibration, which is transmitted from the vibration pen to the vibration transmission plate in response to the signal 41, propagates for a time tg corresponding to the distance to the vibration sensor, and is then detected by the vibration sensor.

In FIG. 15, a signal 42 represents a signal waveform detected by the vibration sensor. Since the vibration used in this case is a Lamb wave, the relationship between the envelope, 43, and the phase, 42, of the detected waveform changes in correspondence with the transmission distance in the vibration transmission plate during the vibration transmission. Let Vg be the propagating velocity of the envelope 43, i.e., the group velocity, and Vp be the advance velocity of the phase 42, i.e., the phase velocity. If the group velocity Vg and the phase velocity Vp are known, the distance between the vibration pen and the vibration sensor can be calculated on the basis of the vibration transmission time.

First, paying attention to only the envelope 43, its velocity is Vg, and when a specific point on the waveform, e.g., the first zero cross point of a signal 44 as the differential waveform of second order of the envelope 43, is detected as an inflection point of the envelope 43, the distance, d, between the vibration pen and the vibration sensor is given by:

$$d = Vg \cdot tg \tag{P1}$$

where tg is the vibration transmission time.

Furthermore, in order to determine the coordinate position of an input point with higher accuracy, processing based on the detection of a phase signal is performed. If the time period from a specific detection point of the phase waveform signal 42, i.e., the vibration application point, to the zero cross point after a predetermined signal level 431 is represented by tp 47 (obtained in such a manner that a window (gate) signal 460 having a predetermined width is generated based on the time in which the level 431 is exceeded, and is compared with the phase signal 42), the distance between the vibration sensor and the vibration pen is given by:

$$d = n \cdot \lambda p + Vp \cdot tp \tag{P2}$$

where $\lambda p$ is the waveform of the elastic wave, and n is an integer.

From the above equations, the integer n is expressed as:

$$n = int[(Vg \cdot tg - Vp \cdot tp)/\lambda p + 1/N] \tag{P3}$$

Note that N assumes an appropriate real number value other than "0". For example, if N=2.0, the value n can be accurately determined even when the detected values tg and tp have an error within a range of ±½ wavelength. When n, calculated in this manner, is used in the above equation, the distance between the vibration pen and the vibration sensor can be measured with high accuracy.

In order to measure the above-mentioned two vibration transmission times tg and tp, signals 45 and 47, indicating the vibration arrival timings, are generated. A signal waveform detection circuit for this purpose has an arrangement shown in FIG. 16.

Referring to FIG. 16, unnecessary frequency components are removed from an output signal (detection signal) from a vibration sensor 6 by a band-pass filter 511. Then, the detection signal is input to an envelope detection circuit 52 constituted by, e.g., an absolute value circuit, a low-pass filter, and the like, and only the envelope is extracted from the detection signal. The timing of an envelope inflection point is detected by an envelope inflection point detection circuit 53. A tg signal detection circuit 54 constituted by a peak detection circuit, a monostable multivibrator, and the like forms a signal tg (the signal 45 in FIG. 15) as an envelope delay time detection signal of a predetermined waveform.

On the other hand, a signal detection circuit 55 forms a pulse signal of a portion, which exceeds the threshold value signal 431 of the predetermined level, in the envelope signal 43 detected by the envelope detection circuit 52. A monostable multivibrator 56 enables the gate signal 460 with a predetermined time width, which is triggered by the first leading edge of the pulse signal. A tp comparator 57 detects the zero cross point of the first leading edge of the phase signal 42 while the gate signal 460 is enabled, thus forming the phase delay time signal tp 47.

When the delay time signal is formed in this manner, the vibration transmission time is measured using the delay time signal as a signal indicating the vibration arrival timing, and the distances between the vibration pen and the plurality of sensors are calculated using the above equations. Thereafter, the coordinate position is geometrically calculated from the calculated distances.

However, the arrangement of the conventional signal detection circuit suffers the following problems.

In the signal waveform detection circuit shown in FIG. 16, the gate signal 460 is enabled at a timing at which the detection signal from the vibration sensor or a signal obtained after the waveform processing of the detection signal exceeds the threshold value 431 of the predetermined level, as shown in FIG. 15. For this reason, when the level of the detection signal from the vibration sensor is lowered, vibrations often cannot be detected. This problem is experienced inevitably as long as the arrangement depends on the detected level of the vibration upon detection of the vibration (discrimination of the arrival of the vibration).

Many factors lower the detected level upon point indication on the vibration transmission plate by the vibration pen. First, the detected level is lowered when the compression force (to be generally expressed as a pen pressure) for pressing the vibration pen against the vibration transmission plate is small. When the coordinate input apparatus is used as a pointer for point indication, a pen pressure of 100 g or more is obtained although there are personal differences. When the pen pressure is 100 g or more, the detected level has a variation amount roughly falling within a two-fold range. However, in the case of a stroke input operation for inputting a character or a figure as a set of continuous coordinate values as is done in accordance with a recent trend, the pen pressure is as low as about several to several tens g. With such a low pen pressure, since the vibration energy injected from the vibration pen into the vibration transmission plate changes to a great extent during use, the variation of the detected level due to the pen pressure increases to about a 10-fold range. Therefore, the threshold value 431 must be set to be small, and the detectable dynamic range of a signal must be broadened. For this purpose, an expensive circuit is required to suppress noise, such as external EMI noise or the like, superposed on the detection signal at each circuit block output stage of the signal waveform detection circuit. Furthermore, when the vibration pen is tilted, i.e., when an operator of the coordinate input apparatus obliquely holds the vibration pen to perform an input operation, the detected level decreases to a very large extent. In addition, when the vibration transmission plate consists of a material such as an acrylic material with a high vibration attenuation factor, or when the vibration transmission plate itself is large in size, a change in the detected level due to the value of the vibration transmission distance cannot be ignored. For this reason, a high detected level must be set to guarantee an effective input operation to assure a predetermined specification range.

Although the arrangement of the conventional signal detection circuit can discriminate the presence/absence of a vibration, it cannot insure accurate coordinate calculations. Equations (P1) to (P3) above hold when given sonic speeds Vg and Vp are constant. In practice, if a Lamb wave is used as an ultrasonic wave, the Lamb wave cannot always be transmitted along the vibration transmission plate at a constant sonic speed. This is because the sonic speed of the Lamb wave changes depending on the wave frequency and the thickness of the vibration transmission plate. It is not difficult to use a vibration transmission plate with a uniform thickness, but it is difficult to use a vibration of a predetermined frequency. In order to electrically generate a vibration of a predetermined frequency, a continuous wave (cw) whose frequency is electrically constant must be used as the driving signal. However, since the transmission time of the vibration must be detected, a short pulse signal 41 must be used as the driving signal to increase the time resolution. Since this signal has a broad frequency band, only a vibration with a broad frequency band (as a combination of a plurality of frequency components) can be obtained.

Similarly, the characteristic itself of the vibration pen serving as an electro-acoustic conversion device poses a problem. The vibration pen is constituted by bringing a medium serving as a pen tip into contact with an internal vibrator. When a device is constituted to have such a resonance structure, the electro-acoustic conversion characteristic, with a narrow frequency band of the vibrator itself, is lost, and a characteristic with a broad frequency band is obtained. Furthermore, under the influence of the high-order modes of mechanical resonance, the conversion characteristic of the vibration pen is very complicated and has a plurality of frequency peaks. For this reason, it is impossible to generate a vibration of a single frequency.

FIG. 17A shows the frequency characteristic of a signal obtained when a vibration generated by a typical vibration pen is detected by the vibration sensor. The pulse repeating frequency of the driving signal 41 is 500 kHz. As can be seen from FIG. 17A, the detected vibration is obtained by combining a plurality of frequencies due to the above-mentioned two cases.

FIG. 17B shows the frequency characteristic of the group velocity Vg of a Lamb wave which propagates along a vibration transmission plate with a thickness d=1.20 to 1.50 mm. FIG. 17C similarly shows the frequency characteristic of the phase velocity Vp. As can be seen from FIGS. 17B and 17C, in fact, vibrations propagate along the vibration transmission plate at various sonic speeds.

The conventional coordinate input apparatus uses the band-pass filter 511 so as to obtain a signal of a single frequency component with the least mixing of other frequency components and to perform accurate coordinate arithmetic processing based on a constant sonic speed. In this case, in order to obtain the above-mentioned accurate coordinate position, the following problem remains unsolved. More specifically, when the level of the signal detected by the vibration sensor changes, the error of the distance information obtained from equation (P3) increases, depending on the enabling timing of the gate signal 460.

This problem is inherent to a system which calculates an input coordinate position concurrently using tg and tp, i.e., the group delay time and the phase delay time. It is obvious that the position of tp shown in FIG. 15 varies in units of wavelengths depending on the enabling timing of the gate signal 460. More specifically, when the detected level is lowered, the enabling timing of the gate signal 460 is delayed, and the next zero cross point of the phase signal 42 is detected as tp. When the detected level rises, the previous zero cross point is detected. As can be seen from equation (P3), if Vg and Vp are constant, the distance can be accurately calculated even if tp varies. However, as described above, when a vibration is defined by a combination of a plurality of frequency components (a plurality of sonic speeds), an error is generated.

FIG. 18 shows the plots of distance errors obtained when distances are calculated using the phase delay tp measured at a predetermined relative position with respect to the phase signal 42 and phase delays tp±λ measured using zero cross points before and after tp. As can be seen from FIG. 18, in order to decrease the distance error and to decrease the error of the obtained coordinate position, it is preferable that the position of tp be immovable. In practice, it is known that most stable detection (with fewer distance errors) is enabled if a zero cross point, which always has a predetermined positional relationship with a peak (a maximum one of peaks included in the phase signal will be simply referred to as a peak hereinafter) of the phase signal 42, is used as tp. Even a plurality of frequency components have a certain central component (500 KHz), and the behavior (the relationship between the transmission distance and the delay time) near the peak of the phase signal 42 is equivalent to that of a vibration of 500 KHz. For this reason, if the phase position from the peak of the phase signal 42 is fixed, the behavior near the peak of the phase signal 42 can be considered as transmission of a vibration of a uniform frequency.

As described above, in the coordinate input apparatus of the ultrasonic wave system which detects a vibration by a method depending on the detected level of a vibration, a signal waveform detection circuit with a broad dynamic range is required and the apparatus becomes expensive. Furthermore, in the system for accurately calculating an input coordinate position using the group delay time and the phase delay time, since the detected level range is narrowed, the use range (the size of the effective area of the vibration transmission plate, the pen pressure, the pen angle, and the like) is narrowed.

FIGS. 19 and 20 show the influences of the transmission distance and the pen pressure as typical factors which cause a change in the detected level of the vibration sensor. FIG. 19 shows the relationship between the detected level and the distance between the vibration pen and the vibration sensor, and FIG. 20 shows the relationship between the detected level and the pen pressure. Recently, size reductions of electronic devices are demanded, and accordingly, the coordinate input apparatus need be rendered compact. For this purpose, the size of the vibration transmission plate must be made close to the size of the effective area which is used for coordinate input in practice. In FIG. 19, the detected level abruptly increases in a region where the distance between the pen and sensor is short. As the distance for the coordinate input decreases, i.e., as the size of the coordinate input apparatus is reduced, the dynamic range to be covered by the signal waveform detection circuit must be broadened.

As shown in FIG. 20, the detected level abruptly changes when the pen pressure is equal to or smaller than 100 g, and this also requires broadening of the dynamic range of the circuit. Although not shown, as the influence of the pen angle, the 90° input state (when the pen is perpendicularly held) and the 60° input state have a detected level difference defining a two-fold range. More specifically, in order to allow coordinate inputs at natural intervals, a detected level margin of twice or more is required since some people hold the pen at an angle of 60° or less.

FIG. 21 shows the prior art (Japanese Patent Publication No. 58-16509) of the signal waveform detection circuit which can broaden the coordinate inputtable detected level range without broadening the dynamic range of the circuit in a conventional coordinate input apparatus of the ultrasonic wave system. The output from a charging/discharging circuit shown in FIG. 21 is used as the base level=threshold value signal of a comparator for triggering a detection signal. A signal Vci is input to the charging/discharging circuit in synchronism with the driving timing of the vibration pen, and the circuit is charged for a time defined by a pulse width T until the start end of a coordinate detection area is reached. Upon discharging, a proper CR time constant is selected, so that the output exponentially attenuates in proportion to the amplitude of a Lamb wave.

However, in this arrangement, since the output infinitely approaches zero upon completion of discharging, the noise level of the circuit must be similarly minimized, and consequently, the dynamic range of the circuit must be broadened. As another problem, the above-mentioned circuit can cover attenuation of the detected level corresponding to the transmission distance, but cannot cover other detected level variation factors. Since the pen pressure and the pen angle of even a single person change upon input, it is insufficient to change the threshold value in correspondence with the transmission distance. Furthermore, since the pen pressure and pen angle vary depending on personal differences, a constant detected level (identical distance) cannot always be obtained. For these reasons, it is difficult to generate an accurate gate signal.

SUMMARY OF THE INVENTION

The present invention has been made in consideration of the above-mentioned prior art, and has as its object to provide a simple coordinate input apparatus which is always stable and assures high accuracy even when a change in detected level upon a change in vibration transmission distance increases due to an increase in the area of an effective area, even when the disturbance noise increases, depending on the use environment of the coordinate input apparatus, and even when the detected level changes due to a change in pen pressure or in the way of holding a pen (pen angle), depending on the users.

In order to achieve the above object, according to the present invention, there is provided a coordinate input apparatus which comprises a vibration transmission plate, and calculates and outputs a coordinate position on the vibration transmission plate indicated by a vibration input pen on the basis of delay times required until an elastic wave vibration input from the vibration input pen onto the vibration transmission plate reaches a plurality of vibration detection means, comprising: envelope output means for outputting an envelope signal of a detection signal from each of the vibration detection means; conversion means for converting the envelope signal into a level signal by adding a predetermined offset to the envelope signal; gate signal output means for outputting a gate signal by detecting a portion, which exceeds the level signal, of the detection signal from each of the vibration detection means; first detection means for detecting a predetermined point of the envelope signal or the detection signal from each of the vibration detection means during a period of the gate signal, and detecting a group delay time on the basis of a group velocity of the vibration with reference to the detected predetermined point; and calculation means for calculating a coordinate position of the vibration input pen on the basis of a transmission time of the vibration based on the group velocity detected by the first detection means. With this arrangement, a coordinate input apparatus which can assure high accuracy independently of the input pen pressure, the vibration input pen angle, and the input position (the vibration transmission distance) can be provided.

Furthermore, the apparatus comprises second detection means for detecting a phase delay time based on a phase velocity of the vibration with reference to a zero cross point of the detection signal from each of the vibration detection means during the period of the gate signal, and the calculation means calculates the coordinate position of the vibration input pen on the basis of the transmission time of the vibration based on the group velocity detected by the first detection means and a transmission time of the vibration based on the phase velocity detected by the second detection means. Also, the apparatus comprises band-pass filter means for filtering a predetermined frequency component in the detection signal from each of the vibration detection means, and the second detection means detects the phase delay time based on the phase velocity of the vibration with reference to the zero cross point of an output signal from the band-pass filter means. With this arrangement, a coordinate input apparatus with higher accuracy can be provided.

There is also provided a coordinate input apparatus which comprises a vibration transmission plate, and calculates and outputs a coordinate position on the vibration transmission plate indicated by a vibration input pen on the basis of delay times required until an elastic wave vibration input from the vibration input pen onto the vibration transmission plate reaches a plurality of vibration detection means, comprising: attenuating level generation means for generating an attenuating level signal which assumes a maximum value at a vibration generation timing of the vibration input pen, assumes a minimum value larger than a noise level after an elapse of the longest vibration transmission time on the vibration transmission plate, and exponentially attenuates to substantially match with an attenuation characteristic of the vibration between the maximum and minimum values; gate signal output means for outputting a gate signal by detecting a portion, which exceeds the level signal, of the detection signal from each of the vibration detection means; first detection means for detecting a predetermined point of the envelope signal or the detection signal from each of the vibration detection means during a period of the gate signal, and detecting a group delay time on the basis of a group velocity of the vibration with reference to the detected predetermined point; and calculation means for calculating a coordinate position of the vibration input pen on the basis of a transmission time of the vibration based on the group velocity detected by the first detection means. With this arrangement, a coordinate input apparatus which can assure high accuracy independently of the input position (vibration transmission distance) can be provided.

Furthermore, the apparatus comprises second detection means for detecting a phase delay time based on a phase velocity of the vibration with reference to a zero cross point of the detection signal from each of the vibration detection means during the period of the gate signal, and the calculation means calculates the coordinate position of the vibration input pen on the basis of the transmission time of the vibration based on the group velocity detected by the first detection means and a transmission time of the vibration based on the phase velocity detected by the second detection means. Also, the apparatus comprises band-pass filter means for filtering a predetermined frequency component in the detection signal from each of the vibration detection means, and the second detection means detects the phase delay time based on the phase velocity of the vibration with reference to the zero cross point of an output signal from the band-pass filter means. In addition, the apparatus comprises means for adjusting the maximum and minimum values of the attenuating level. With this arrangement, a coordinate input apparatus with higher accuracy can be provided.

DETAILED DESCRIPTION OF THE PREFERRED EMBODIMENTS

A coordinate input apparatus according to an embodiment of the present invention will be described hereinafter with reference to the accompanying drawings.

[First Embodiment]

Figure 2:
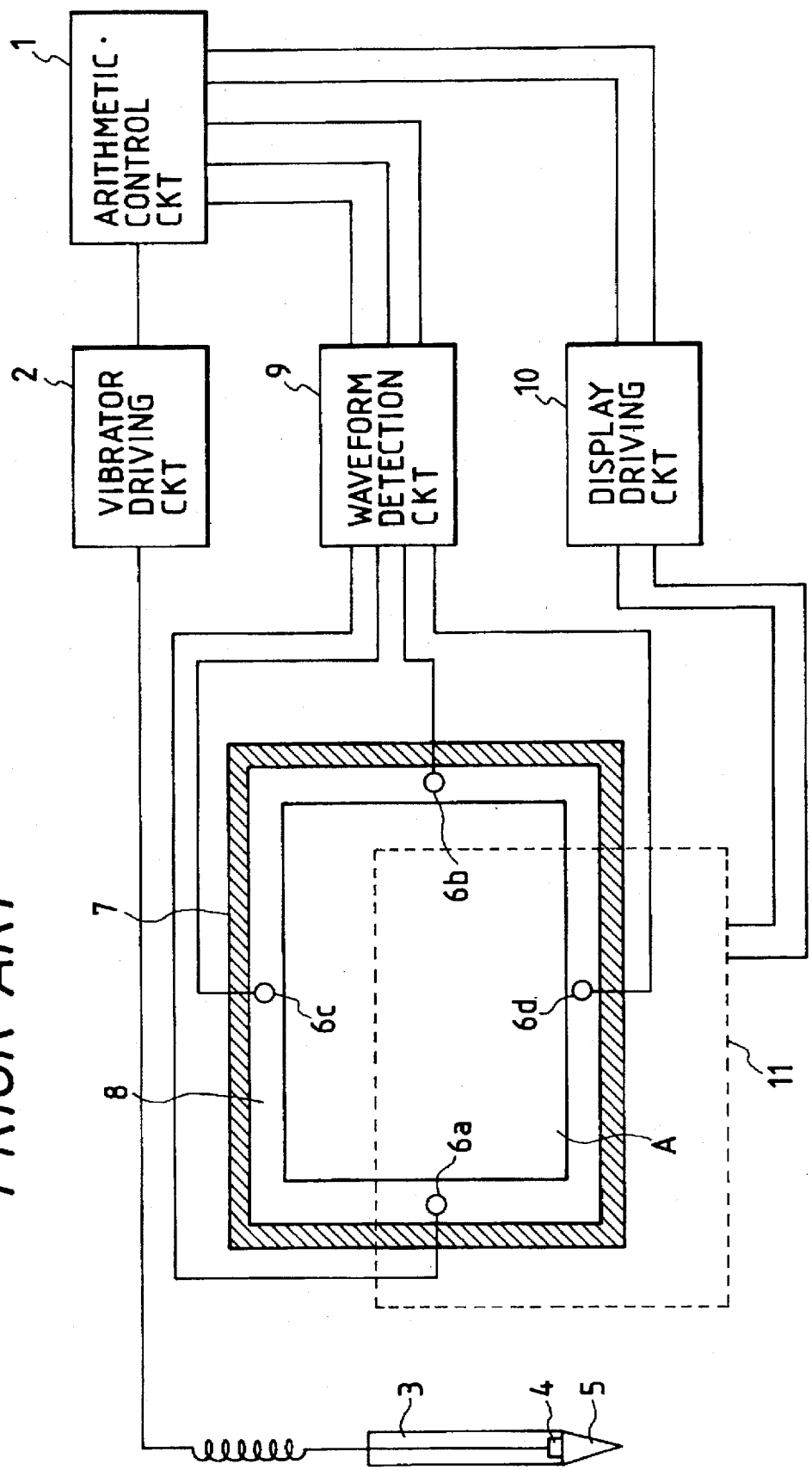
FIG. 2 is a block diagram of a conventional coordinate input apparatus.
Figure 3:
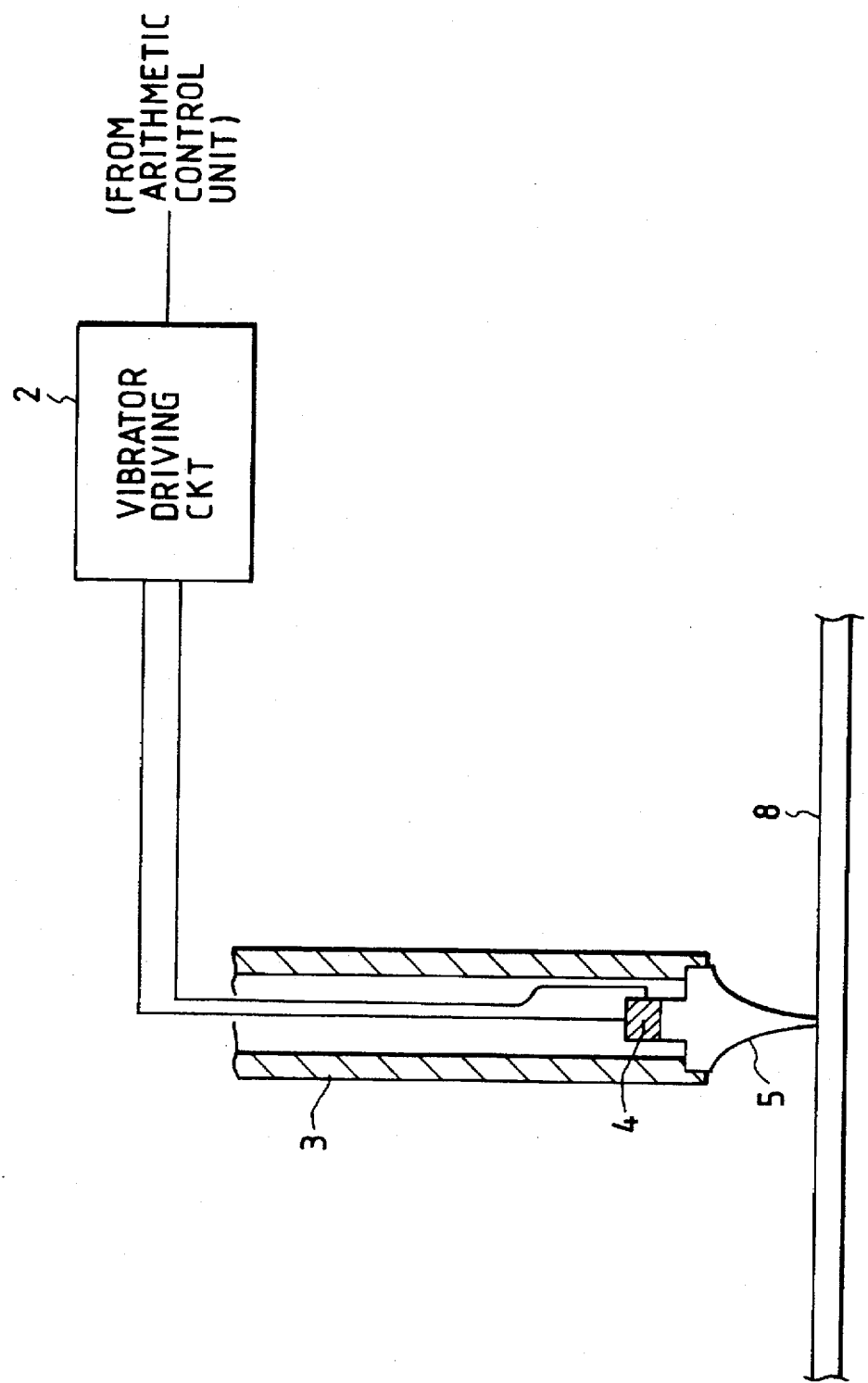
FIG. 3 is a diagram showing the arrangement of a vibration pen.

FIGS. 2 and 3 are schematic block diagrams showing the arrangement of a coordinate input apparatus of an ultrasonic input system according to this embodiment. In FIGS. 2 and 3, an arithmetic control circuit 1 controls the entire apparatus, and calculates coordinate positions. A vibrator driving circuit 2 vibrates the pen tip in a vibration pen 3. A vibration transmission plate 8 consists of a transparent member such as an acrylic or glass plate. A coordinate input operation by means of the vibration pen 3 is attained by touching the surface of the vibration transmission plate 8 with the pen 3. More specifically, a position in an area A (to be referred to as an effective area hereinafter) indicated by a solid line in FIG. 2 is designated by the vibration pen 3, so that the coordinate position of the vibration pen 3 can be calculated.

In order to prevent (or reduce) a propagating wave from being reflected by the end face of the vibration transmission plate 8 and returning to the central portion, an anti-vibration member 7 is provided on the outer peripheral portion of the vibration transmission plate 8. As shown in FIG. 2, vibration sensors 6a to 6d, such as piezoelectric elements, each for converting a mechanical vibration into an electrical signal, are fixed near the inner side of the anti-vibration member. A signal waveform detection circuit 9 outputs vibration detection signals from the vibration sensors 6a to 6d to the arithmetic control circuit 1. A display 11, such as a liquid crystal display, can attain a display in units of dots, and is disposed behind the vibration transmission plate. Upon driving of a display driving circuit 10, the display 11 displays a dot at a position indicated by the vibration pen 3, and a user can observe this dot via the vibration transmission plate 8 (since it comprises a transparent member). A vibrator 4 built in the vibration pen 3 is driven by the vibrator driving circuit 2. A driving signal for the vibrator 4 is supplied from the arithmetic control circuit 1 as a low-level pulse signal, which is amplified with a predetermined gain by the vibrator driving circuit 2. Thereafter, the signal is applied to the vibrator 4. The electric driving signal is converted into a mechanical vibration by the vibrator 4, and is transmitted to the vibration transmission plate 8 via pen tip 5.

The vibration frequency of the vibrator 4 is selected to be a value, which can generate a Lamb wave in the vibration transmission plate 8, such as glass. When the vibrator is driven, a vibration mode in the vertical direction in FIG. 3 with respect to the vibration transmission plate 8 is selected. When the vibration frequency of the vibrator 4 is set to be the resonance frequency of a structure including the pen tip 5, efficient vibration conversion can be realized. An elastic wave transmitted to the vibration transmission plate 8 is a Lamb wave, and is not easily influenced by scratches, obstacles, and the like on the surface of the vibration transmission plate as compared to a surface wave.

<Description of Arithmetic Control Circuit>

In the above arrangement, the arithmetic control circuit 1 outputs a signal for driving the vibrator driving circuit 2 and the vibrator 4 in the vibration pen 3 every predetermined period (e.g., every 5 msec), and starts a time measurement operation using its internal timer (comprising a counter). A vibration generated by the vibration pen 3 propagates along the vibration transmission plate 8, and reaches the vibration sensors 6a to 6d while being delayed in correspondence with distances thereto.

The signal waveform detection circuit 9 detects signals from the vibration sensors 6a to 6d, and generates signals indicating the vibration arrival timings to the vibration sensors by waveform detection processing (to be described later). Also, the signal waveform detection circuit 9 inputs these signals in units of sensors to the arithmetic control circuit 1 to detect the vibration transmission times to the respective vibration sensors 6a to 6d, drives the display driving circuit 10 based on the position information of the vibration pen 3 to control the display operation of the display 11, and outputs coordinate information to an external apparatus (not shown) via serial or parallel communications.

Figure 4:
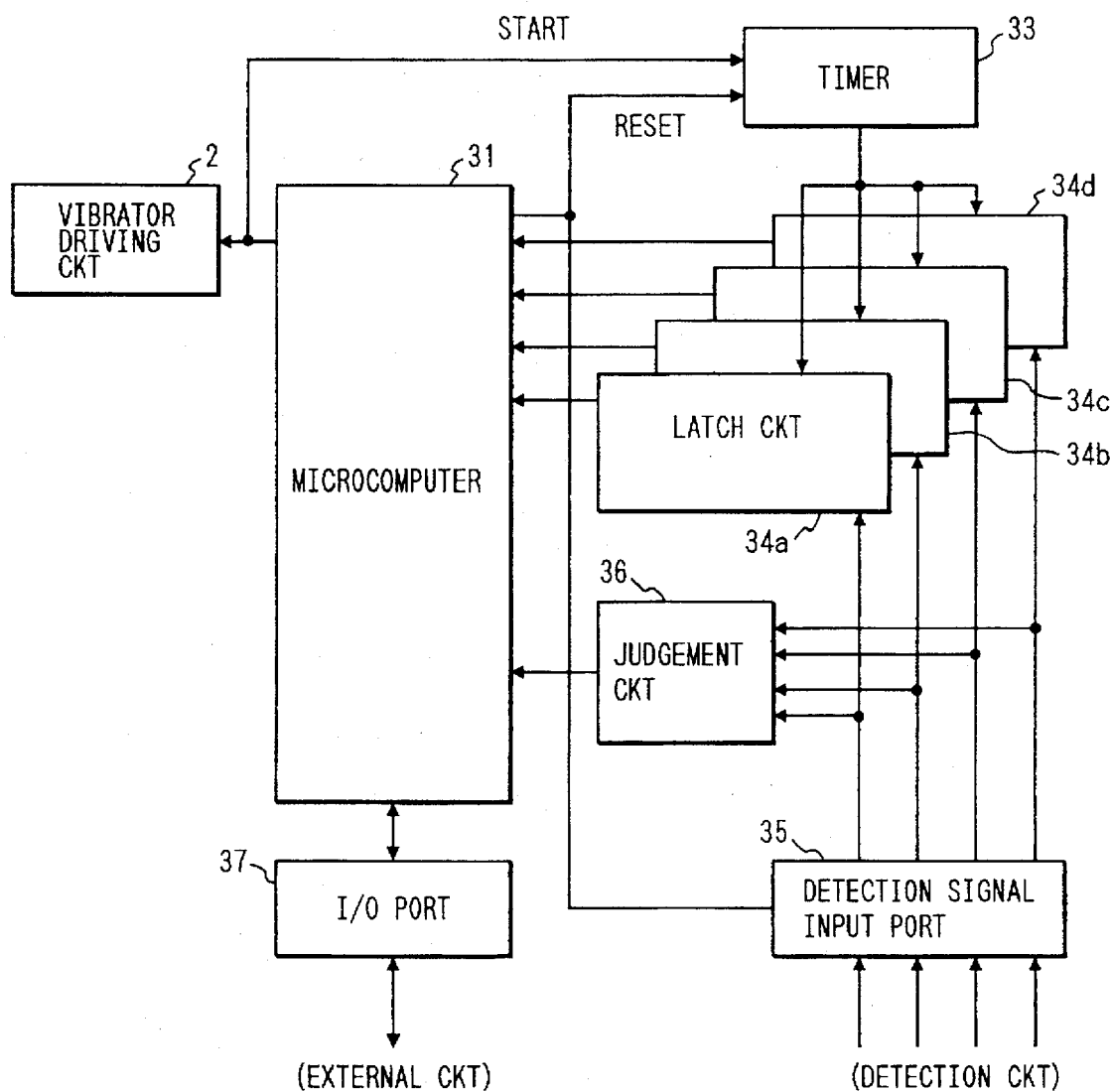
FIG. 4 is a block diagram showing the internal arrangement of an arithmetic control circuit.

FIG. 4 is a schematic block diagram showing the arrangement of the arithmetic control circuit 1. The respective components and their operations will be described below.

Referring to FIG. 4, a microcomputer 31 controls the arithmetic control circuit 1 and the entire coordinate input apparatus, and comprises an internal counter, a ROM which stores the processing sequence, a RAM used for, e.g., calculations, a nonvolatile memory for storing, e.g., constants, and the like. A timer 33 (comprising, e.g., a counter) measures reference clocks (not shown). When a start signal for starting the driving operation of the vibrator 4 in the vibration pen 3 is input to the vibrator driving circuit 2, the timer 33 starts a time measurement operation. In this manner, the time measurement operation is started in synchronism with the vibration detection by the sensors, and the delay times, until the sensors 6a to 6d detect a vibration, can be measured.

Circuits as other components will be described in turn below.

The vibration arrival timing signals from the vibration sensors 6a to 6d, which signals are output from the signal waveform detection circuit 9, are input to latch circuits 34a to 34d via a detection signal input port 35. The latch circuits 34a to 34d respectively correspond to the vibration sensors 6a to 6d. Upon reception of the timing signal from the corresponding sensor, each latch circuit latches the time measurement value of the timer 33 at that time. When a judgment circuit 36 judges reception of all the detection signals, the circuit 36 outputs a signal indicating this to the microcomputer 31. Upon reception of the signal from the judgment circuit 36, the microcomputer 31 reads the vibration transmission times to the respective vibration sensors from the corresponding latch circuits 34a to 34d, and calculates the coordinate position of the vibration pen 3 on the vibration transmission plate 8 by performing a predetermined calculation. Then, the microcomputer 31 outputs the calculated coordinate position information to the display driving circuit 10 via an I/O port 37, thus displaying, e.g., a dot at the corresponding position on the display 11. Alternatively, the microcomputer 31 may output the coordinate position information to an interface circuit via the I/O port 37, thus outputting the coordinate value to an external apparatus.

The principle of measuring the vibration transmission times from the vibration pen 3 to the vibration sensors 6a to 6d will be described below. Prior to this description, the method of calculating the distance between a given vibration sensor and the vibration pen from the vibration transmission time will be explained.

Since the vibration used in the apparatus of this embodiment is a Lamb wave, the relationship between the envelope, 43, and the phase, 42, of the detected waveform changes in correspondence with the transmission distance in the vibration transmission plate 8 during the transmission of the vibration. Let Vg be the propagating velocity of the envelope 43, i.e., the group velocity, and Vp be the advance velocity of the phase 42, i.e., the phase velocity. If the group velocity Vg and the phase velocity Vp are known, the distance between the vibration pen and the vibration sensor can be calculated on the basis of the vibration transmission time.

First, paying attention to only the envelope 43, its velocity is Vg, and the distance, d, between the vibration pen 3 and the vibration sensor 6 is expressed based on the vibration transmission time, tg', as follows:

$$d = Vg \cdot tg \quad (1)$$

This equation can express the distance between each of all the vibration sensors 6a to 6d and the vibration pen 3.

Furthermore, in order to determine coordinate positions with higher accuracy, processing based on the detection of a phase signal is performed. Based on the phase delay time tp' calculated by the above-mentioned method, the distance d between the vibration sensor and the vibration pen is given by:

$$d = n \cdot \lambda p + Vp \cdot tp \quad (2)$$

(tg and tp used in equations are values obtained by subtracting the delay time of circuits and the like from tg' and tp', and will be described in detail later) where λp is the waveform of the elastic wave, and n is an integer.

From equations (1) and (2) above, the integer n is expressed as:

$$n = \text{int}[(Vg \cdot tg - Vp \cdot tp)/\lambda p + 1/N] \quad (3)$$

Note that N assumes an appropriate real number value other than "0". For example, if N=2.0, the value n in equation (2) can be accurately determined even when the detected values tg and tp have an error within a range of ±½ wavelength. When n calculated in this matter is substituted in equation (2), the distance between the vibration pen 3 and the vibration sensor 6a can be measured with high accuracy.

The times actually measured by the signal waveform detection circuit 9 are tg' and tp' including an offset corresponding to the delay time in the vibration pen 3 and the circuits. Before substitution of these times in equations (2) and (3), the offset must be subtracted from tg' and tp' to obtain tg and tp. In order to measure the above-mentioned, two vibration transmission times tg' and tp', the signal waveform detection circuit 9 for generating signals 45 and 47 has an arrangement shown in FIG. 1.

<Description of Vibration Transmission Time Detection (FIGS. 1,6, and 7)>

Figure 1:
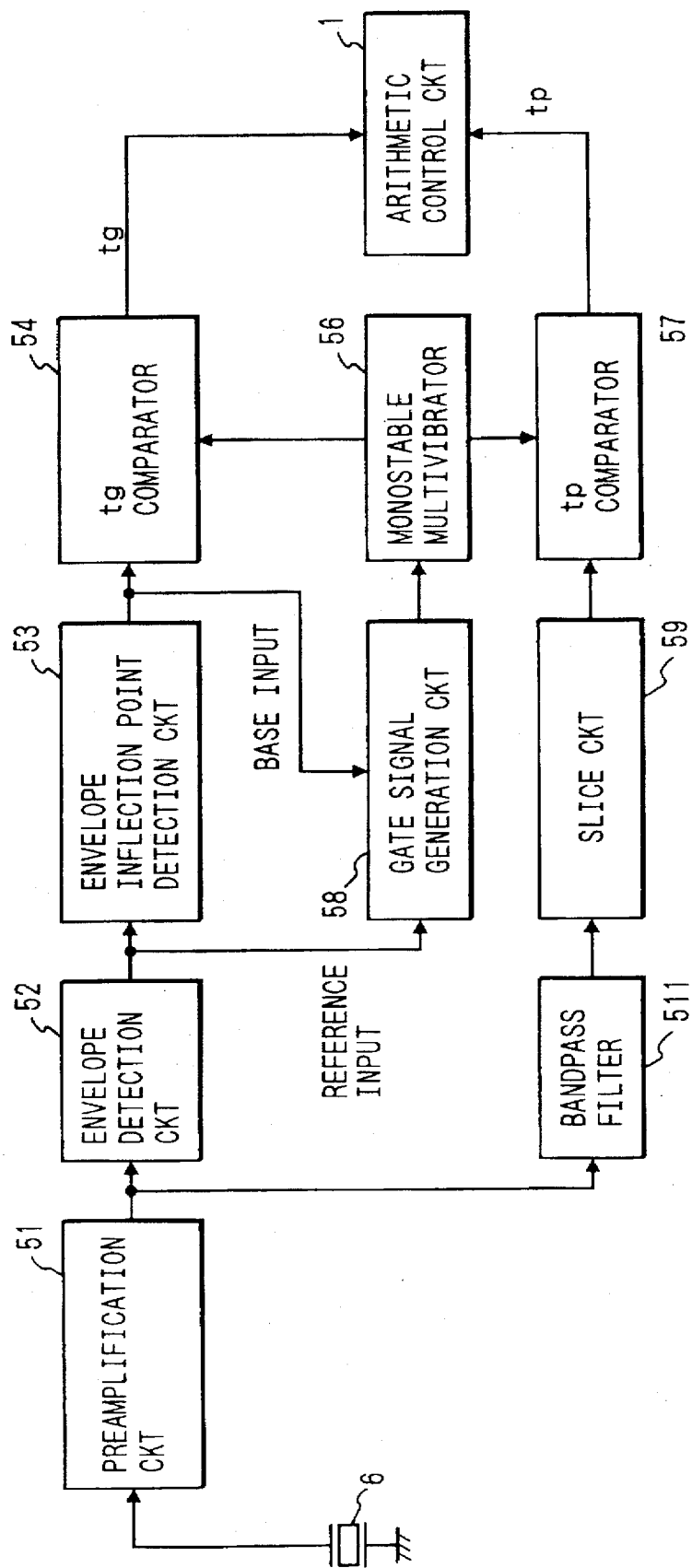
FIG. 1 is a block diagram of a signal waveform detection circuit according to the present invention.

FIG. 1 shows the arrangement of the signal waveform detection circuit 9 of the coordinate input apparatus according to the embodiment of the present invention. The principle of measuring the vibration transmission time in this embodiment (FIG. 1) will be described using the explanatory view of the waveform processing sequence shown in FIG. 6. Note that a vibration sensor 6 to be described below represents the sensors 6a to 6d, the same processing is performed for the respective sensors, and the coordinate position of an input point is calculated based on the calculated distances between the respective vibration sensors and the vibration pen.

A vibration generated in response to a driving signal 41 is detected by the vibration sensor 6. A signal 40 shown in FIG. 6 corresponds to a signal waveform which is detected by the vibration sensor and is then amplified by a preamplification circuit 51. By short (two shots of) driving signals 41, the detected waveform, which is short in time, is obtained. This is to prevent a detection error caused by interference (superposing) between unnecessary reflected wave components and a vibration to be detected in the vibration transmission plate 8 (mainly, at the end face of the vibration transmission plate 8), and to attain a size reduction of the entire apparatus. Since the calculation processing of the group delay time (tg) is easily influenced by a reflected wave, the short detection signal 40 is directly utilized in envelope detection. More specifically, an envelope detection circuit 52 receives the signal waveform 40, and outputs the envelope 43. However, in order to attain the above-mentioned high-accuracy coordinate arithmetic processing, a signal filtered by a band-pass filter 511 is used in the calculation of the phase delay time (tp).

As the vibration transmission times, a time from the driving timing to a specific detection point=a certain zero cross point of the phase waveform signal 42 is detected as tp', and a time from the driving timing to a specific point (in this embodiment, the first zero cross point of the differential waveform of second order is obtained as the inflection point of an envelope) of the envelope signal 43 is detected as tg'. In order to obtain the inflection point of the envelope, the envelope 43 is input to an envelope inflection point detection circuit 53, and a differential waveform 44 of second order is generated.

The signal 44 (to be also referred to as an output from the inflection point detection circuit 53) obtained as a result of the second-order differential processing of the envelope signal serves as an input signal to a tg comparator 54 for generating a tg' signal 45. However, disturbance noise is already mixed in this signal 44 before the vibration reaches the vibration sensor 6, and the signal 44 is not a constant signal at zero level. For this reasons, a tg' signal may be erroneously generated due to the noise, and in order to avoid this, the tg comparator 54 is preferably set in a standby state until the vibration reaches the vibration sensor. Thus, as in the prior art which utilizes a gate signal in tp' detection, a gate signal 46 output from a monostable multivibrator 56 is utilized in tg' detection. That is, the gate signal is used in the calculations of the two vibration transmission times (tg' and tp').

The characteristic feature of this embodiment is the way of enabling the gate signal, which is utilized for stably detecting the two specific points. The operation of a gate signal generation circuit 58 for generating the enabling timing of the gate signal in FIG. 1 will be described below with reference to FIG. 6.

The envelope signal 43, as the output from the envelope detection circuit 52, is input to the gate signal generation circuit 58. The gate signal generation circuit 58 generates a reference level signal 441 by attenuating the input envelope signal 43 to an appropriate amplitude, and then adding a predetermined offset to the signal. The gate signal generation circuit 58 also receives the differential output waveform 44 of second order from the envelope inflection point detection circuit 53, and outputs a gate generation signal 442 by comparing the waveform 44 with the reference level signal 441. The monostable multivibrator 56 outputs a gate signal 46 having a predetermined pulse width from the leading edge timing of the input gate generation signal 442 to the tg comparator 54 and a tp comparator 57.

The signals tg' and tp' are generated using the gate signal 46 generated as described above, as follows.

Figure 6:
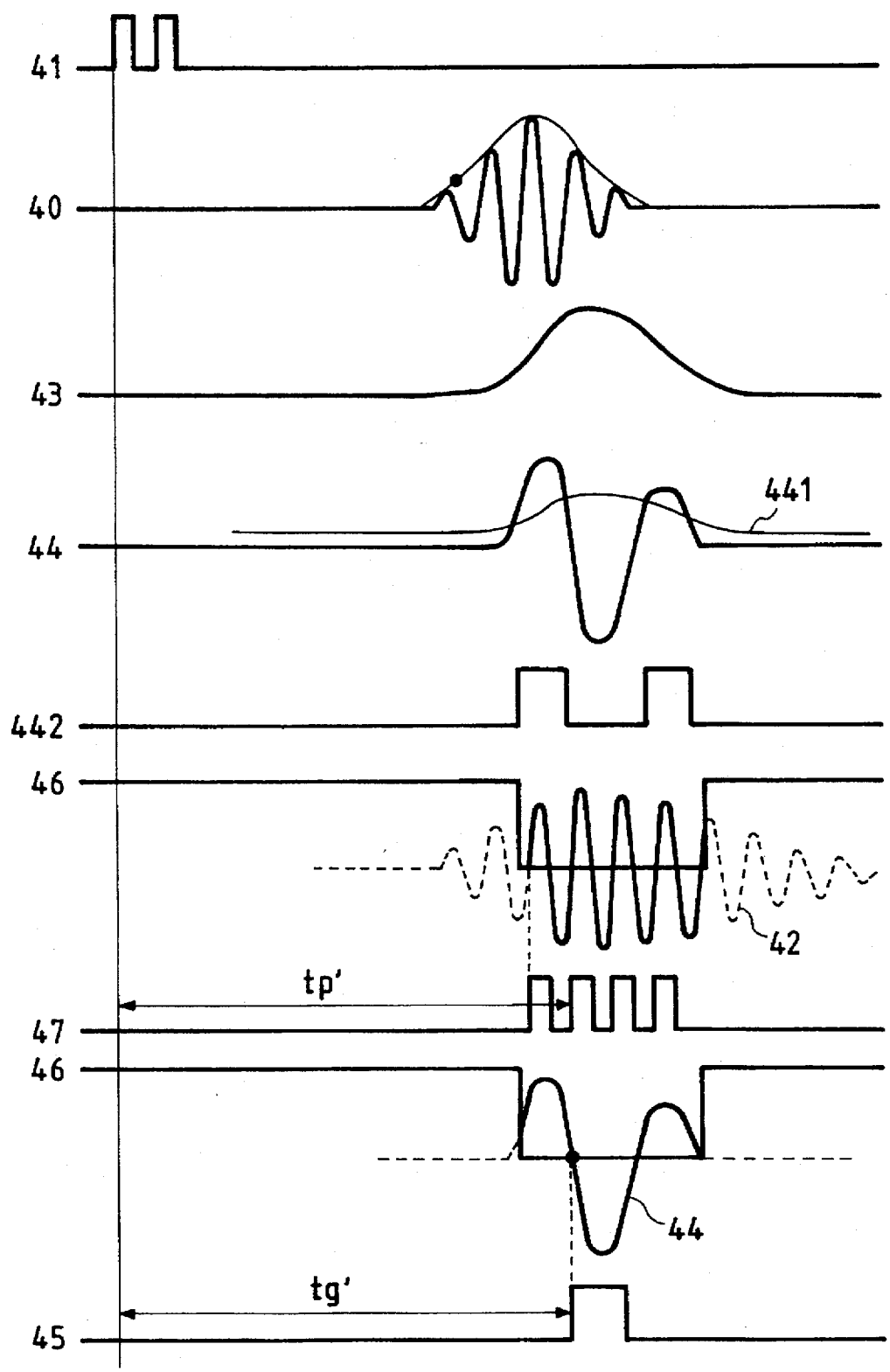
FIG. 6 is a timing chart of signal processing according to the present invention.

As for the signal tp', the waveform 40 is converted into a frequency component signal with a predetermined width by the band-pass filter 511, and is then sliced to a predetermined amplitude level or lower by a slice circuit 59 (level compression of the waveform). When the phase signal 42, as the output from the slice circuit 59, and the gate signal 46 are input to the tp comparator 57, the tp comparator 57 detects a zero cross point of the leading edge, corresponding to a predetermined order, of the phase signal 42 (the output signal from the slice circuit 59) while the gate signal 46 is enabled, and supplies a phase delay time signal tp' 47 to the arithmetic control circuit 1. In FIG. 6, tp' uses the zero cross point of the second leading edge.

On the other hand, the tg comparator 54 receives the gate signal 46 and the differential waveform 44 of second order, and generates a tg' signal using the zero cross point during the enabled period of the gate signal 46 as an inflection point of the envelope 43.

Figure 18:
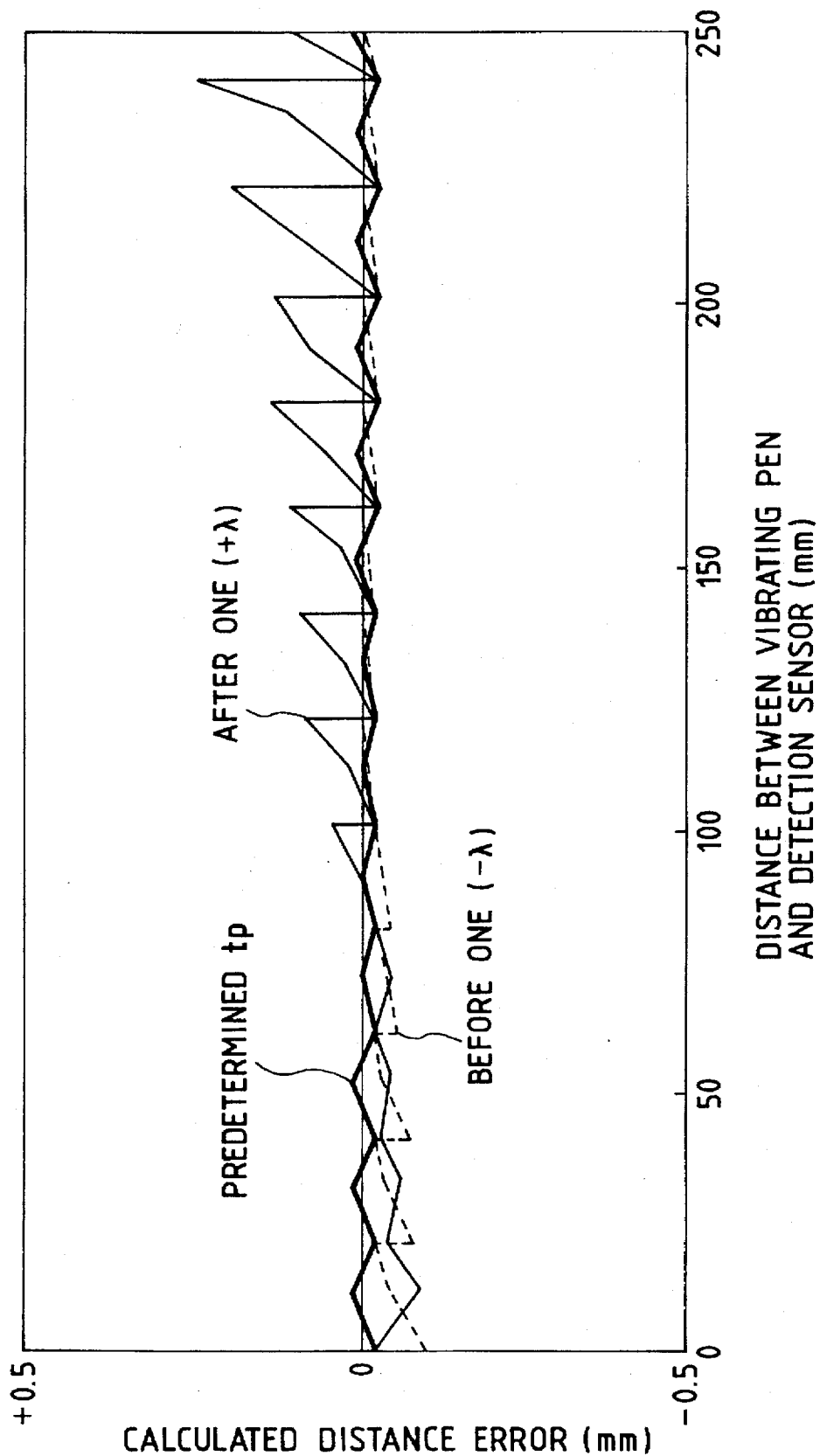
FIG. 18 is a graph for explaining distance errors due to deviations of the tp detection point.

As can be seen from the above description, the above-mentioned arrangement can make the enabling timing of the gate signal 46 constant independently of the detected level of a vibration. More specifically, when the detected level of a vibration varies, the amplitudes of the envelope and the differential waveform of second order vary in correspondence with the variation in the detected level. For this reason, the relative relationship between the two signals is such that they deviate from each other in the direction of the amplitude, but maintain the same relationship in the direction of the time base. The constant timing means that the gate is always enabled for substantially the same time interval before the peak position of the phase waveform signal 42. When the gate is enabled using a fixed threshold value like in the prior art, if the level of the detected signal 40 from the vibration sensor 6 decreases, the gate signal is delayed, and a calculation is made using the zero cross point of the phase waveform signal 42 after the peak as tp'. In this case, even when an identical coordinate position is input, the distance calculation error increases when the pen pressure is low or the pen is extremely inclined. The calculated distance error value at the detection point (+λ) immediately after the predetermined point in FIG. 18 is about 0.3 mm for a long distance. Similarly, when the distance decreases and the pen pressure increases, the point before the predetermined point is used as the tp' detection point, and the calculated distance error value (−λ) immediately before the predetermined point in FIG. 18 is obtained. The effect of this embodiment is that the calculated distance error becomes zero.

Figure 7:
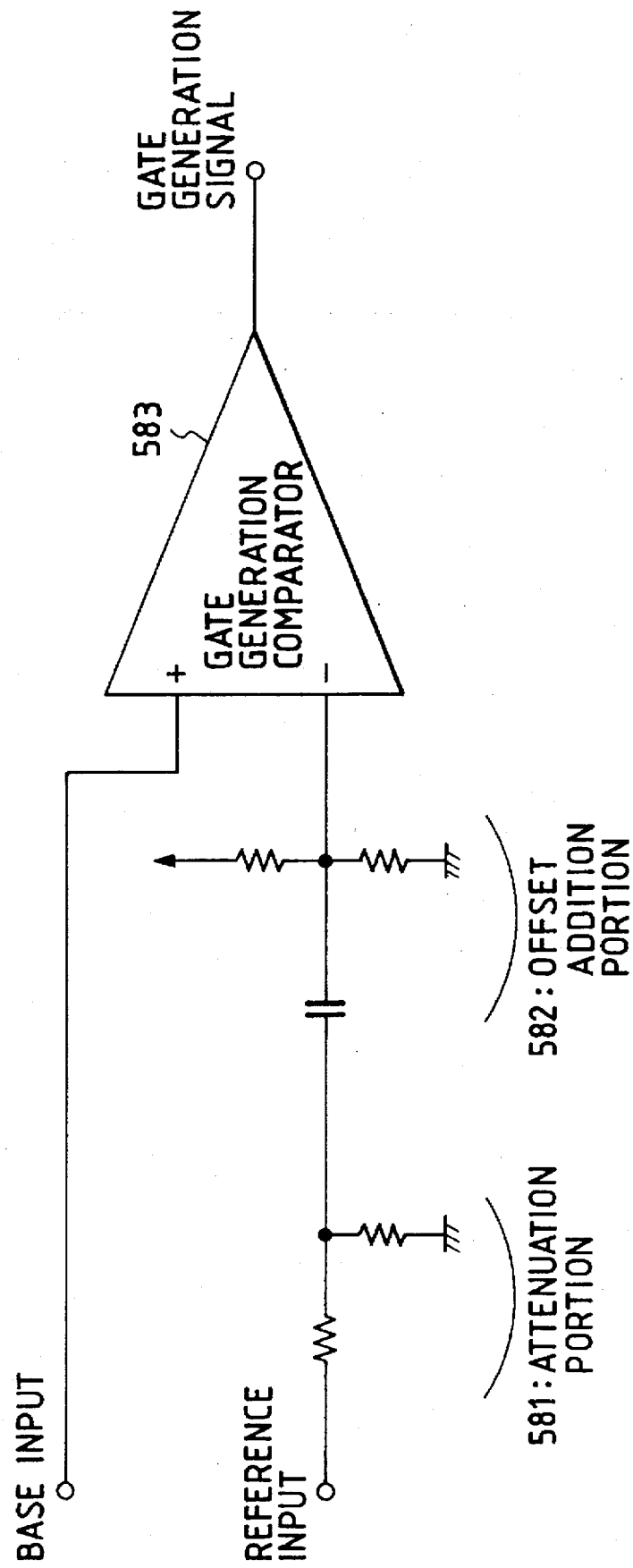
FIG. 7 is a circuit diagram showing the arrangement of a gate signal generation circuit.

FIG. 7 shows an example of the arrangement of the gate signal generation circuit 58. The reference input from the envelope detection circuit 52 is attenuated at a predetermined rate by a resistor bridge of an attenuation portion 581, and a predetermined offset voltage is added to the attenuated signal by a bias circuit of an offset addition portion 582. Then, the signal is input to a gate generation comparator 583 as a reference level signal 441. The gate generation comparator 583 calculates the difference between the differential output waveform 44 of second order from the inflection point detection circuit 53 and the reference level signal 441, and outputs the difference as a pulse signal.

Figure 10:
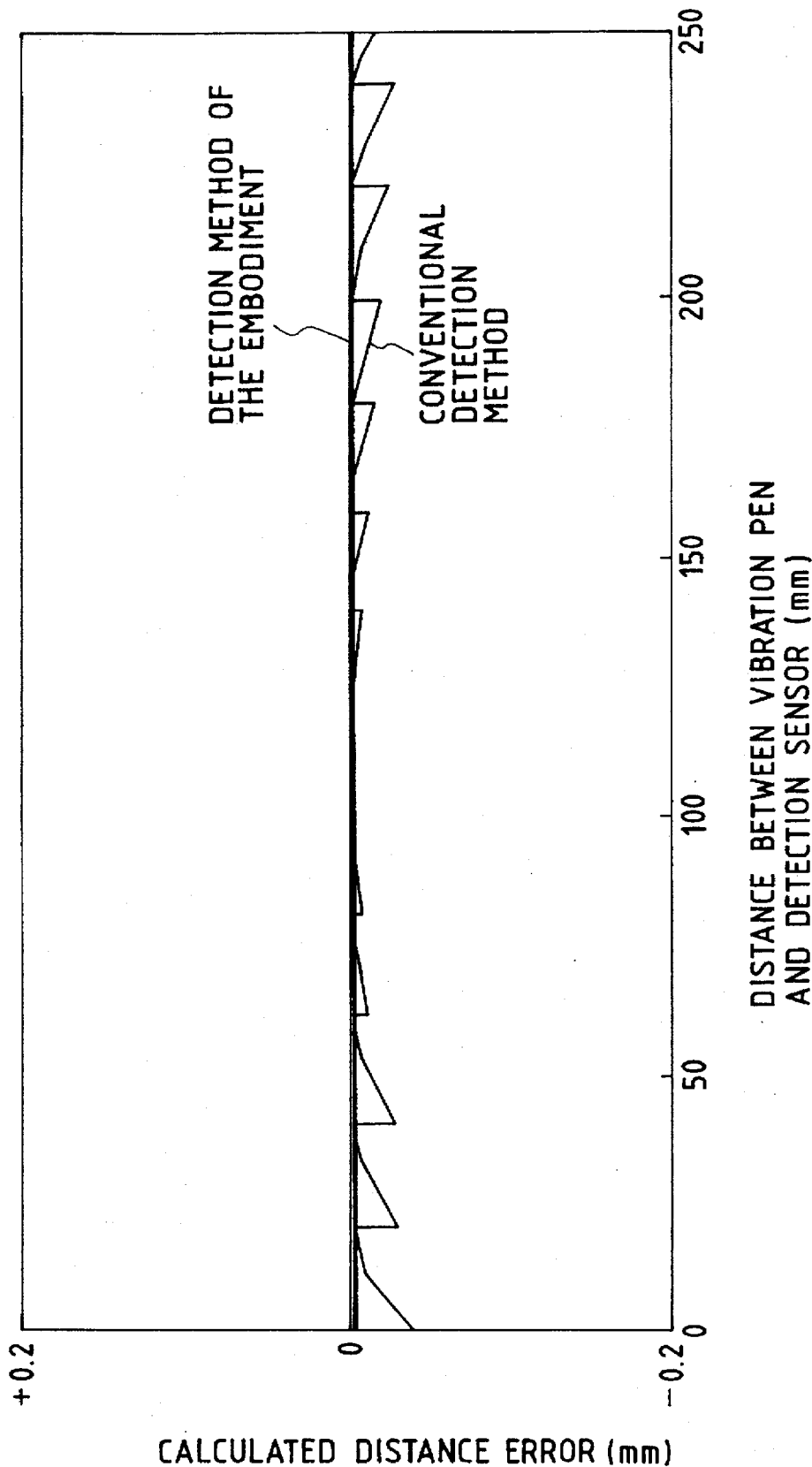
FIG. 10 is a graph for explaining the effect of the present invention.
Figure 19:
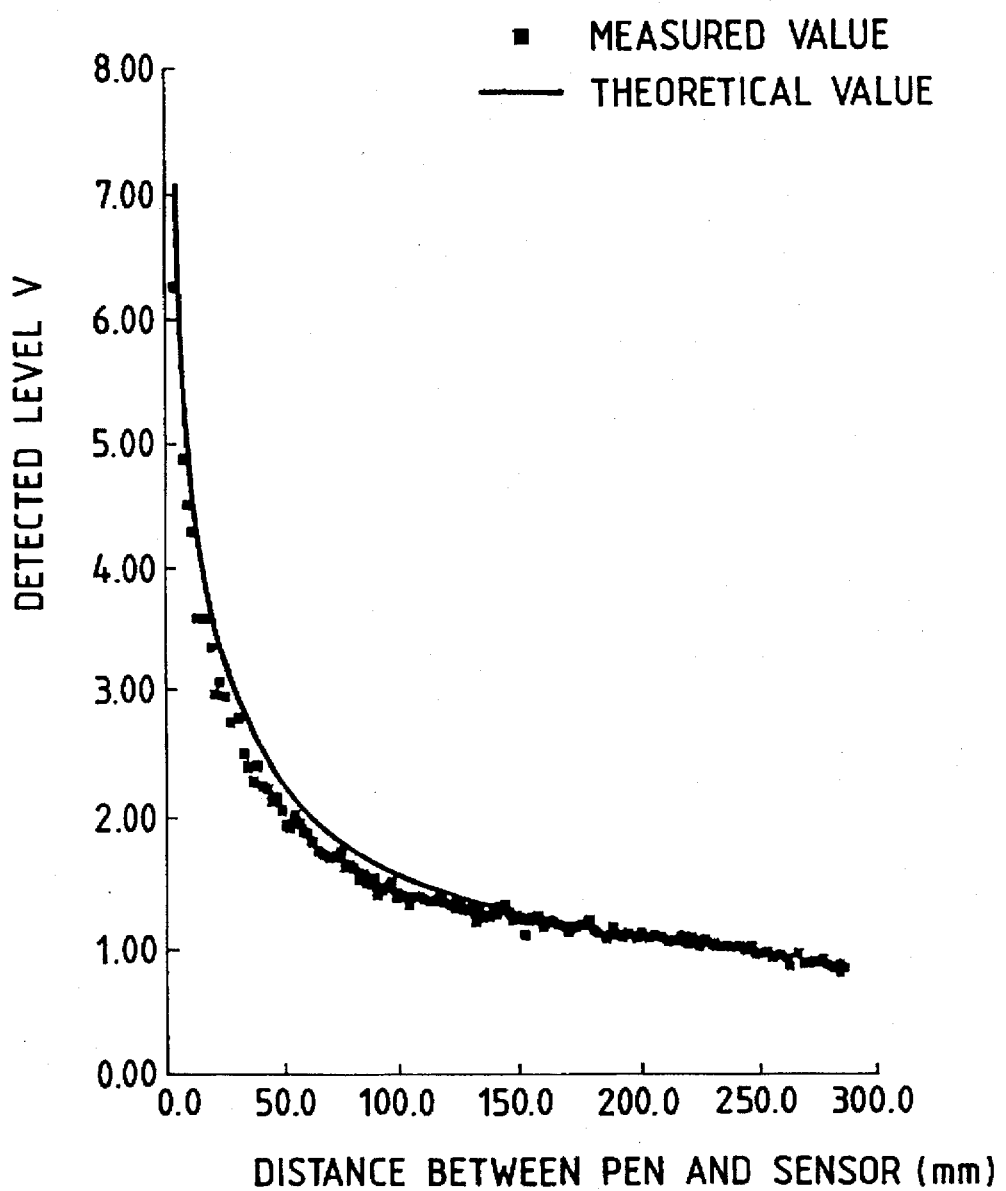
FIG. 19 is a graph showing the relationship between the vibration propagation distance and the detected level.

Another effect of this embodiment will be described below with reference to FIG. 10. In FIG. 10, the calculated distance error in the conventional detection method is indicated by a thin line, and the calculated distance error in this embodiment is indicated by a bold line. The scale of the ordinate in FIG. 10 is slightly smaller than that in FIG. 18. In the conventional detection method, when a vibration is input from a short distance position (the distance between the pen and sensor), since the detected level abruptly increases, as shown in FIG. 19, the gate signal is enabled too early. A front point, a point near the peak, and a rear point of the Lamb wave of the phase waveform signal 42 have different time movements depending on the distance of the waveform specific point (zero cross point). In other words, these points behave as if they have different phase velocities Vp. This phenomenon is caused by different frequency components of the phase waveform signal 42 dispersed along the time base. Therefore, when the distance between the pen and the sensor is small and tp' is located in front of the peak position, a distance error shown in FIG. 10 is generated. When the distance is large, an error with an inverted sign is generated, as shown in FIG. 10.

As can be seen from FIG. 10, almost no calculated distance error is generated in the detection method of the present invention. The effect of this embodiment, which varies the threshold value indicating the enabling timing of the gate signal in correspondence with the detected level, is obvious.

In the arrangement of this embodiment, the conversion processing to the reference level signal executed by the gate signal generation circuit 58, i.e., the magnitudes of the attenuation amount and the offset amount added by the offset addition portion 582 in FIG. 7 are important. The offset amount to be added need only be larger than the maximum noise amplitude of the differential output waveform 44 of the second order. On the other hand, the attenuation amount with which an appropriate gate signal is obtained need only be calculated once in correspondence with the gain of the inflection point detection circuit 53. For example, when the gain of the envelope is 1 (0 dB) and the detected waveform has approximately five waves like the waveform 40, an appropriate attenuation rate is ⅓ to ½.

<Description of Circuit Delay Time Correction>

A method of correcting the detected delay times tg' and tp' to true delay times tg and tp will be explained below.

The vibration transmission time, which is latched by each latch circuit 34 in response to the signals tg' and tp' input to the arithmetic control circuit 1 as trigger signals, includes a circuit delay time et and a phase offset time toff. The amount of an error caused by these delay times is always the same upon transmission of a vibration from the vibration pen 3 to the vibration sensors 6a to 6d via the vibration transmission plate 8.

Figure 5:
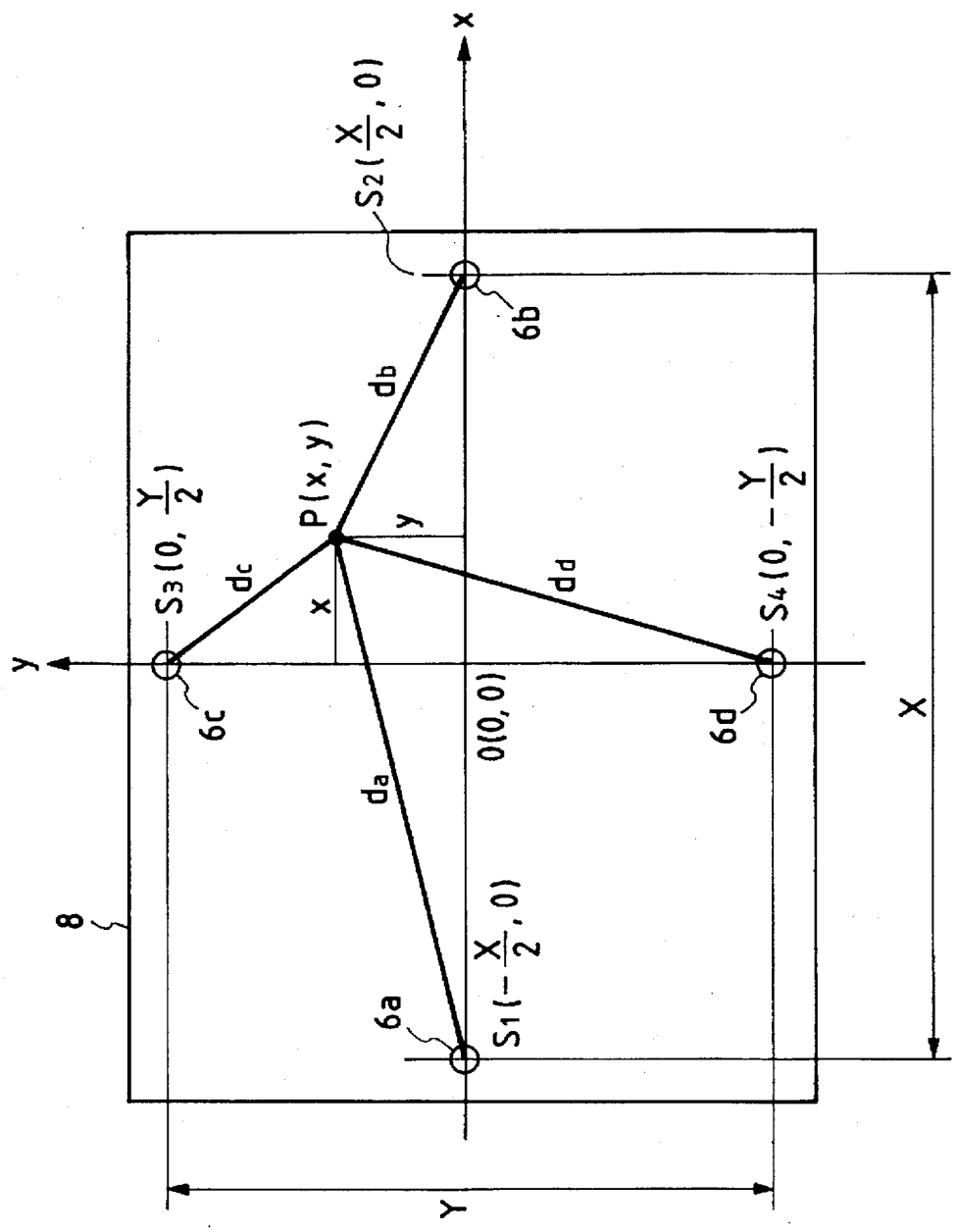
FIG. 5 is a view showing the coordinate system of a coordinate system input apparatus.

Thus, let R1 (=x/2) be the distance from the position of an origin O in FIG. 5 to, e.g., the vibration sensor 61, let tgz' and tpz' be the actually measured vibration transmission times from the origin O to the sensor 6a of a vibration which is input at the origin O by the vibration pen 3, and let tgz and tpz be the true transmission times from the origin O to the sensor. Then, these distance and transmission times satisfy the relations below in association with the circuit delay time et and the phase offset toff:

$$tgz'=tgz+et \quad (4)$$

$$tpz'=tpz+et+toff \quad (5)$$

On the other hand, the actually measured values tg' and tp' at an arbitrary input point P similarly satisfy:

$$tg'=tg+et \quad (6)$$

$$tp'=tp+et+toff \quad (7)$$

The differences between equations (4) and (6), and equations (5) and (7) are:

$$tg'-tgz'=(tg+et)-(tgz+et)=tg-tgz \quad (8)$$

$$tp'-tpz'=(tp'+et+toff)-(tpz+et+toff)=tp-tpz \quad (9)$$

In this manner, the circuit delay time et and the phase offset toff included in each transmission time are removed, and the difference from the true transmission delay time, corresponding to the distance between the origin O and the input point P having the position of the sensor 6a as the start point, can be calculated. Using equations (2) and (3) above, the distance difference can be calculated.

Since the distance from the vibration sensor 6a to the origin O is pre-stored in, e.g., the nonvolatile memory and is known, the distance between the vibration pen 3 and the vibration sensor 6a can be determined. The same applies to other sensors 6b to 6d.

The actually measured values tgz' and tpz' at the origin O are stored in the nonvolatile memory upon delivery, and equations (8) and (9) are executed before calculations of equations (2) and (3), thus allowing measurements with high accuracy.

<Description of Coordinate Position Calculation (FIG. 5)>

The principle of actual coordinate position detection on the vibration transmission plate 8 using the vibration pen 3 will be explained below with reference to FIG. 5.

Assume that the four vibration sensors 6a to 6d are arranged at positions S1 to S4 near the middle points of the four sides on the vibration transmission plate 8. Based on the above-mentioned principle, straight line distances da to dd from the position P of the vibration pen 3 to the respective vibration sensors 6a to 6d can be calculated. Furthermore, the coordinates (x, y) of the position P of the vibration pen 3 on the basis of the straight line distances da to dd as follows:

$$x = (da+db) \cdot (da-db)/2X \qquad (10)$$

$$y = (dc+dd) \cdot (dc-dd)/2Y \qquad (11)$$

where X and Y are respectively the distance between the vibration sensors 6a and 6b and the distance between the vibration sensors 6c and 6d.

As described above, the coordinate position of the vibration pen 3 can be detected in real time.

The coordinate position input in this manner has an accurate and stable value due to the following effects inherent to the coordinate input apparatus of this embodiment.

1. The enabling timing of the gate signal 46 is constant with respect to the peak position of the phase waveform signal 42 independently of the detected level of a vibration. For this reason, the position of a zero cross point, detected as tp', becomes constant with respect to the peak position of the phase waveform signal 42, and an error of tp, due to a change in pen pressure or the inclination of the pen, can be suppressed, thus suppressing the calculated distance error.

2. Since the group delay time tg is detected at the enabling timing of the gate signal 46, the wrong tg can be prevented from being detected due to detection of the envelope of noise.

3. In the conventional detection method, when the input distance (the distance between the pen and the sensor) is small, the detected level abruptly increases, and the gate signal is enabled too early. A front point, a point near the peak, and a rear point of the Lamb wave of the phase waveform signal 42 undergo different time movements depending on the distance of the waveform specific point (zero cross point). In other words, these points behave as if they have different phase velocities Vp. This phenomenon is caused by different frequency components of the phase waveform signal 42 dispersed along the time base. Therefore, when the distance between the pen and the sensor is small and tp' is located in front of the position of the peak, a distance error shown in FIG. 10 is generated. When the distance is large, an error with an inverted sign is generated, as shown in FIG. 10. As can be seen from FIG. 10, almost no calculated distance error is generated in the detection method of this embodiment.

[First Modification]

Figure 8:
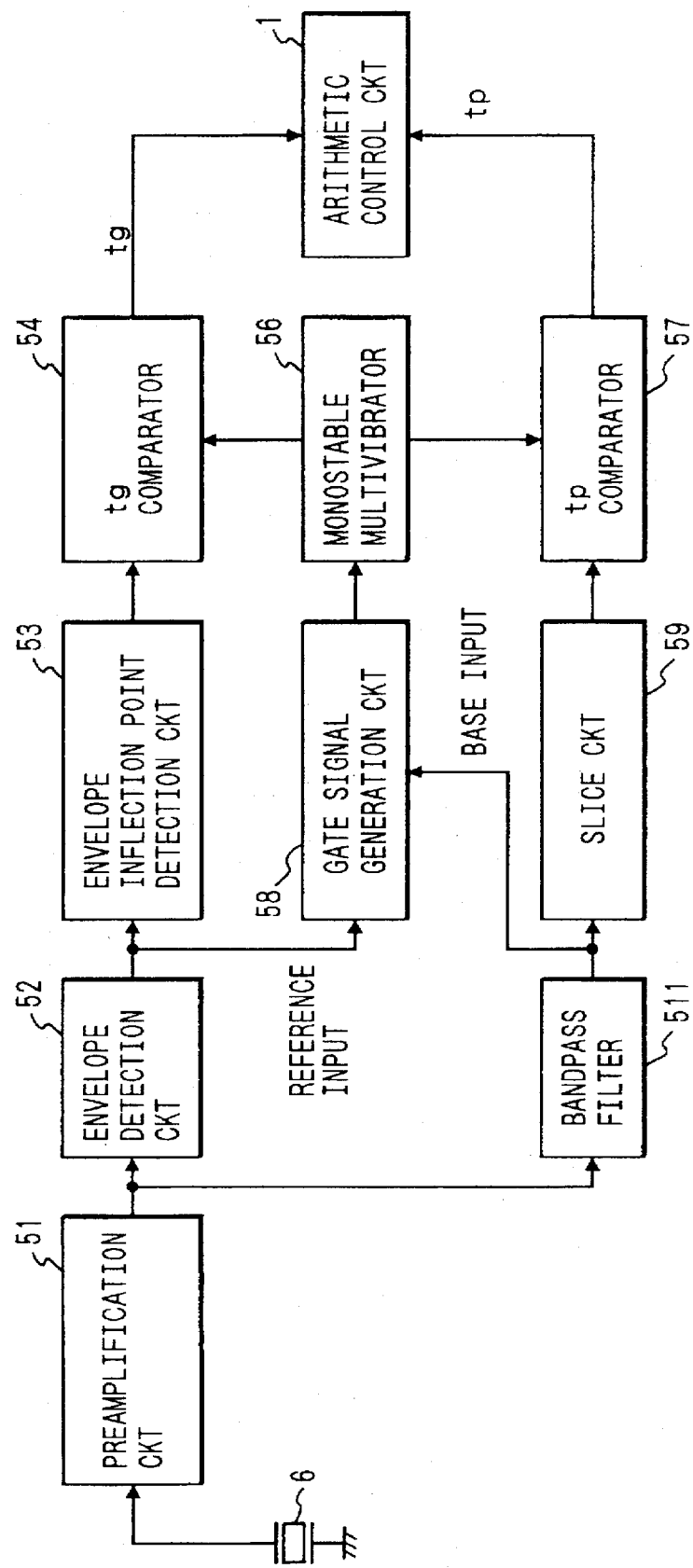
FIG. 8 is a block diagram showing a signal waveform detection circuit according to another embodiment of the present invention.
Figure 9:
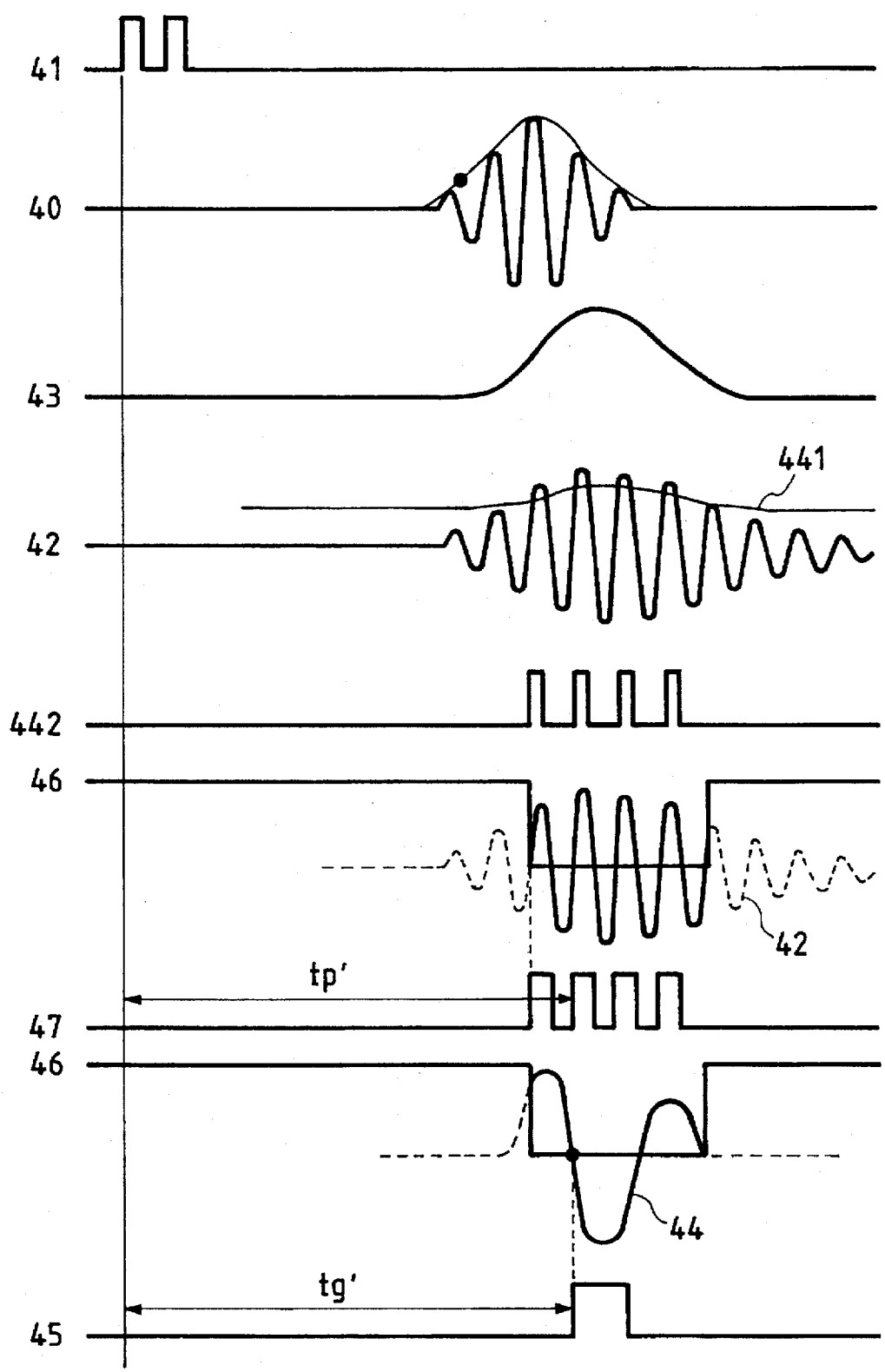
FIG. 9 is a timing chart of signal processing according to another embodiment.

FIG. 8 shows the first modification of the signal waveform detection circuit 9 according to the embodiment of the present invention. In this modification, the output signal from the band-pass filter 511 is used as a base signal upon generation of the gate generation signal. FIG. 9 shows the waveform processing state. In the arrangement of the above embodiment, a problem to be described below is often posed.

As shown in FIG. 6 as well, the waveform processing in the signal waveform detection 9 generates a delay time corresponding to the circuit delay before and after the processing. In this case, no problem is posed when the delay time of the output (the differential output waveform 44 of second order) from the envelope inflection point detection circuit 53 as the base signal in FIG. 6 is equal to the delay time defined by the processing time included in the reference level signal 44. However, if these delay times are not equal to each other, the gate signal cannot be enabled at a constant timing independently of the detected level. Thus, the arrangement shown in FIG. 8 is adopted, and when the delay times in the phase waveform signal 42 and the reference level signal 441 are substantially equal to each other, the phase waveform signal 42 is utilized as the base signal. More specifically, the phase waveform signal 42 is compared with the reference input 441 to generate the signal 442, and the gate signal 46 is enabled for a predetermined period of time from the first leading edge of the signal 442. The processing operations by the tg and tp converters are the same as those in the above embodiment.

In this arrangement, it should be noted that the offset level to be added is set to be larger than that in FIG. 6 since the rise time of the waveform of the phase waveform signal 42 is longer than the envelope signal 43. One of the arrangements shown in FIGS. 1 and 8 may be selected depending on the characteristics of the respective circuit blocks in the signal waveform detection circuit, as described above.

With this arrangement, the time difference between the base input and the reference input to the gate signal generation circuit 58, i.e., the time difference required for the processing in the envelope inflection point detection circuit 53 can be eliminated, and the gate signal 46 can be generated at a constant timing with respect to the reference signal 441.

[Second Embodiment]

Figure 11:
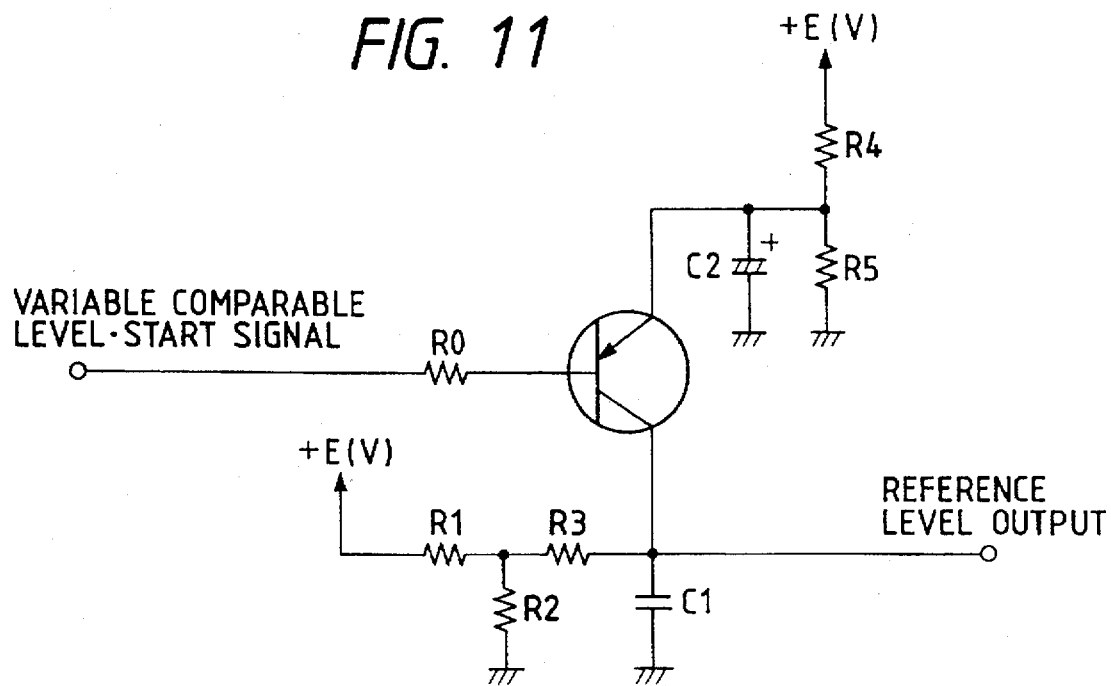
FIG. 11 is a circuit diagram showing the arrangement of a variable comparable level generation circuit according to still another embodiment of the present invention.

FIG. 11 shows a comparable level generation circuit used in a coordinate input apparatus according to the second embodiment, which can solve the conventional problem. The arrangement of the apparatus of this embodiment is substantially the same as that of the first embodiment (shown in FIGS. 2, 3, and 4), except for the arrangement of the signal waveform detection circuit 9.

Figure 14:
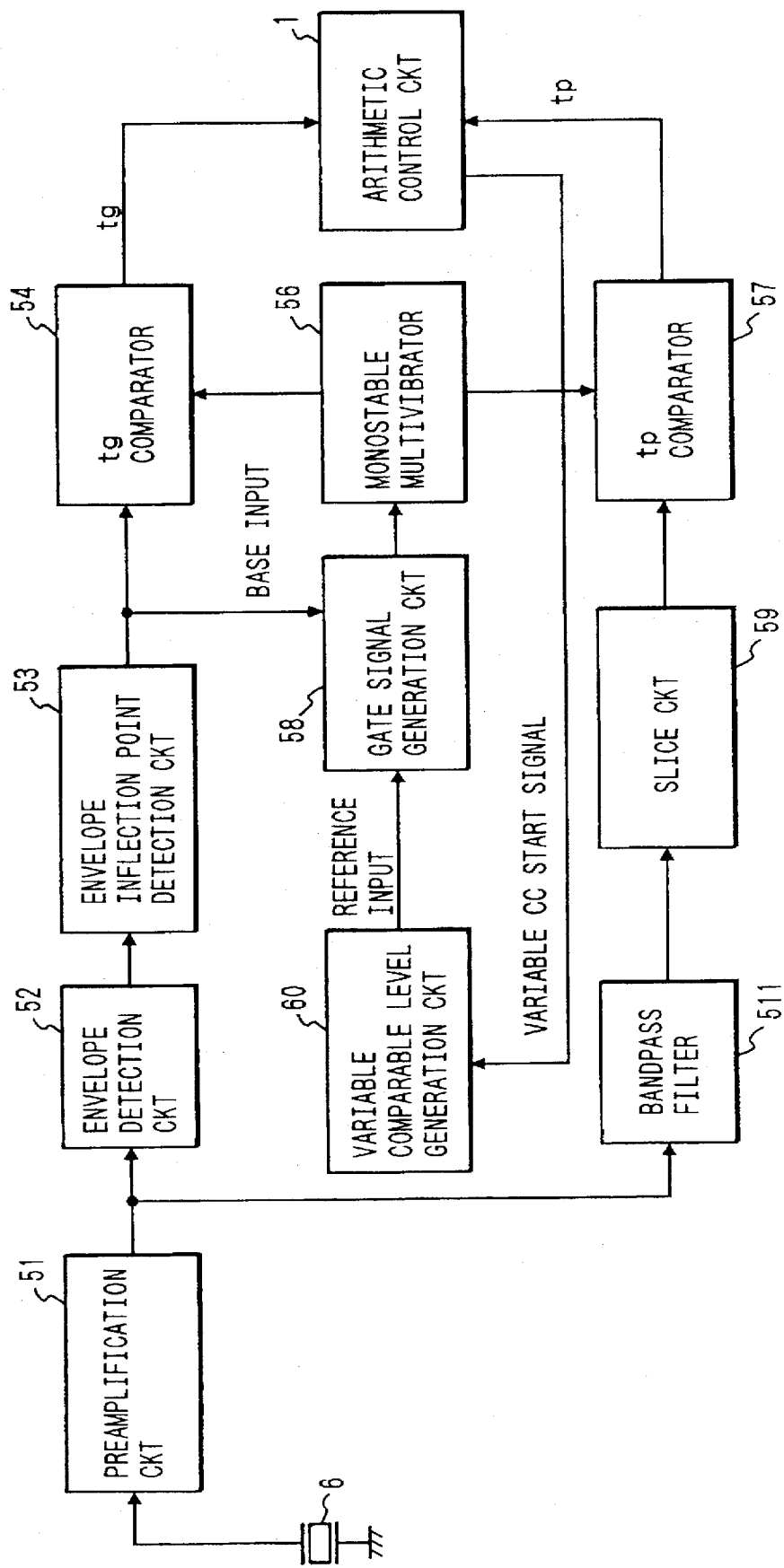
FIG. 14 is a block diagram of a signal waveform detection circuit comprising the variable comparable level generation circuit.
Figure 15:
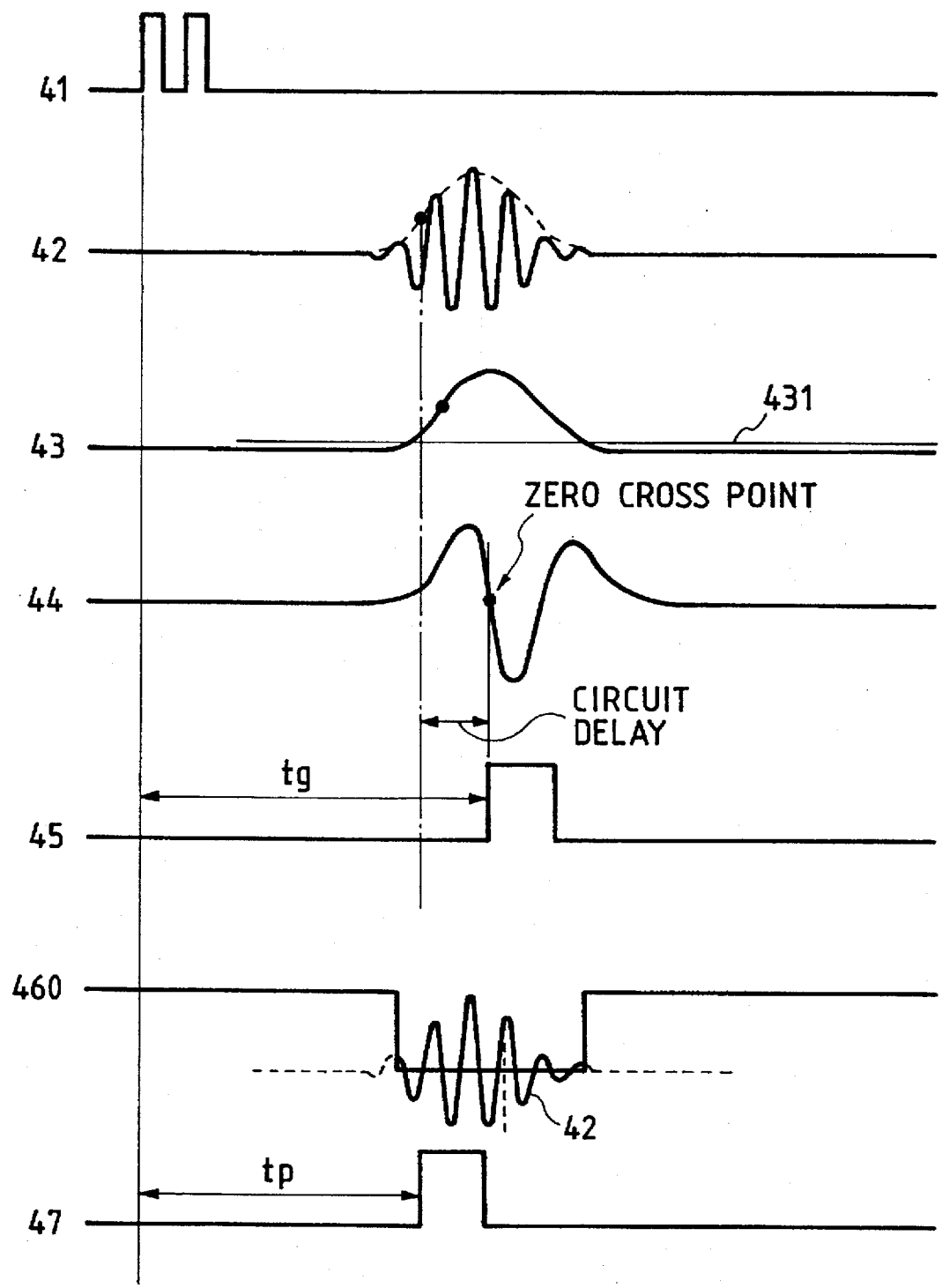
FIG. 15 is a timing chart of conventional signal processing.
Figure 16:
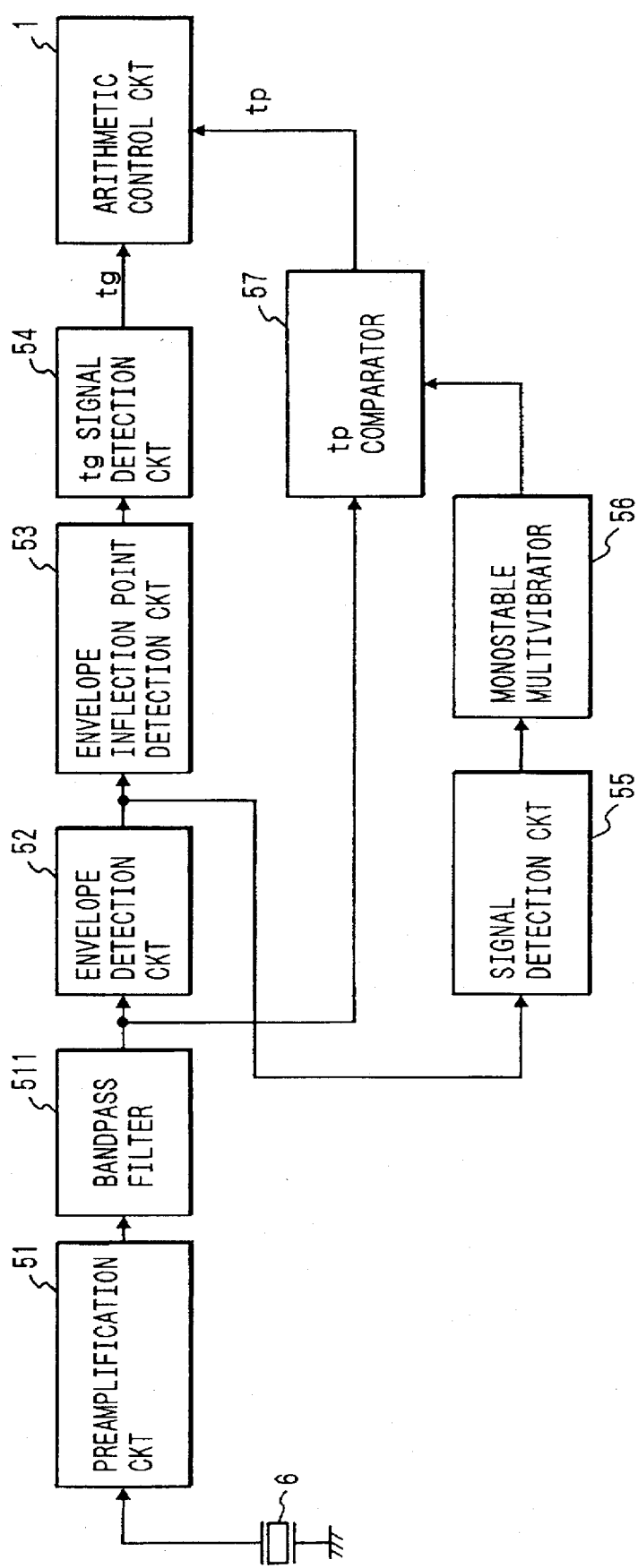
FIG. 16 is a block diagram of a conventional signal waveform detection circuit.
Figure 17A:
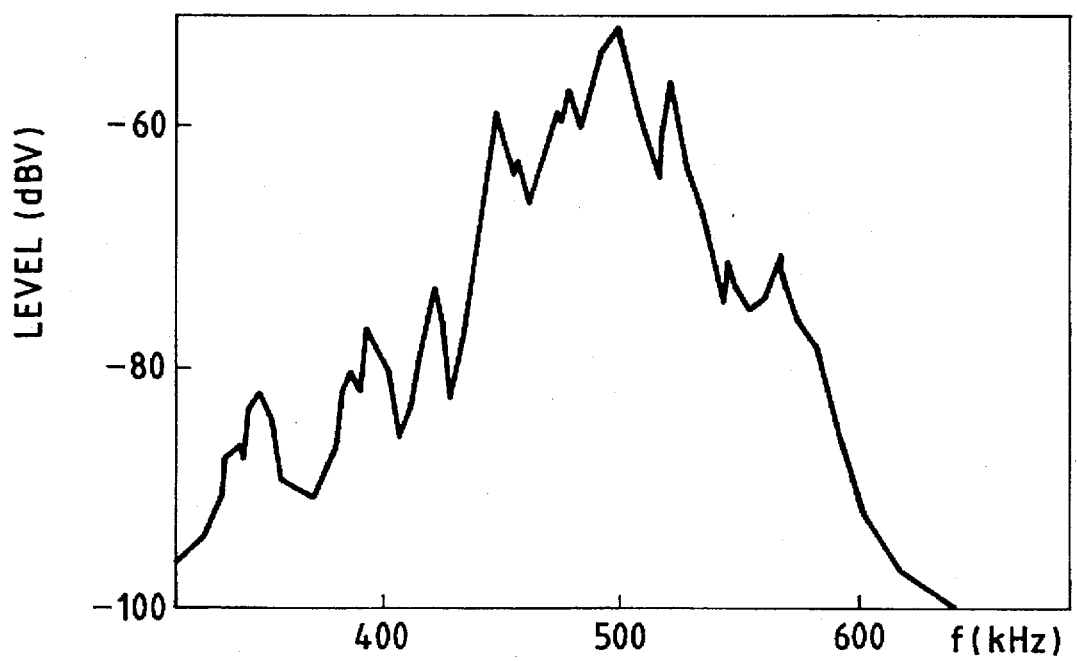
FIGS. 17A, 17B, and 17C are graphs showing the frequency characteristics of the detection signal and the propagation velocities of the Lamb wave.
Figure 17B:
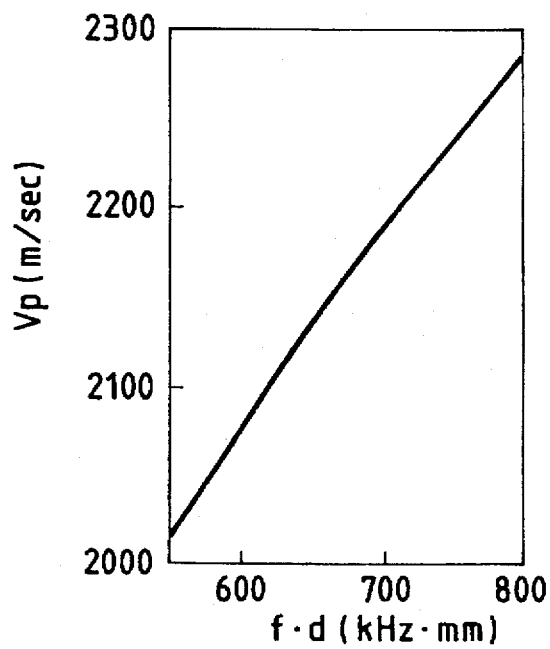
Figure 17C:
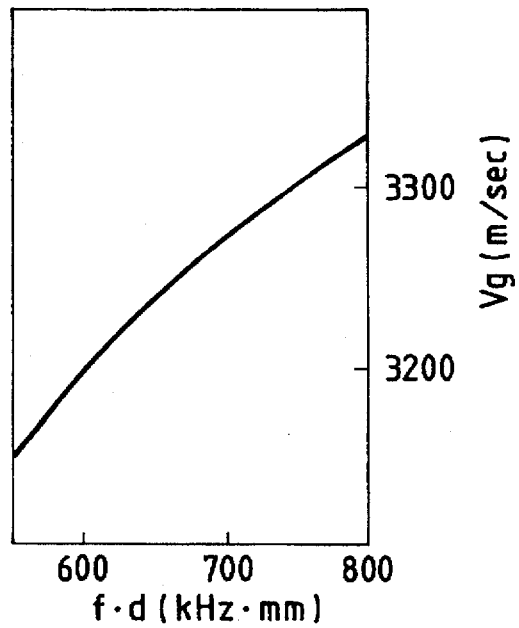

FIG. 11 shows a variable comparable level generation circuit for generating a base signal to the gate signal generation circuit 58 in FIG. 8. FIG. 14 is a schematic block diagram of the signal waveform detection circuit 9 using the variable comparable level generation circuit, and FIG. 12 is an input\output waveform chart of a variable comparable level generation circuit 60.

A variable comparable level start signal 443 (to be referred to as a CC start signal 443 hereinafter) synchronous with the driving signal 41 is input from the arithmetic control circuit 1 to the variable comparable level generation circuit 60. A transistor in FIG. 11 is turned on when the CC start signal 443 is at low level, and an electric charge is transferred from a capacitor C2 to a capacitor C1. As a result, the capacitor C1 is charged, and the potential of a reference level output terminal rises, as shown in a period tc in FIG. 12. After the charging, the CC start signal 443 changes to High level, and the transistor is turned off. As a result, the charge built up on the capacitor C1 is discharged via resistors R3, R1, and R2, and at the same time, the capacitor C2 is charged via a bridge of resistors R4 and R5. The maximum comparable level in FIG. 12 assumes a maximum value when the CR time constant (R4 and C1) is sufficiently shorter than the charging time tc (the pulse width of the Cc start signal 443), and corresponds to a potential divided by the bridge of the resistors R4 and R5. On the other hand, the minimum comparable level assumes a minimum value when the CR time constant (C1 and R2+R3) is sufficiently shorter than a period up to the next driving timing, and corresponds to the bridge potential of the resistors R1 and R2. The latter CR time constant is set to be short, so that the reference level output is minimized within the maximum transmission time. The maximum comparable level can be designed to assume a value about 60% of the maximum value.

Figure 12:
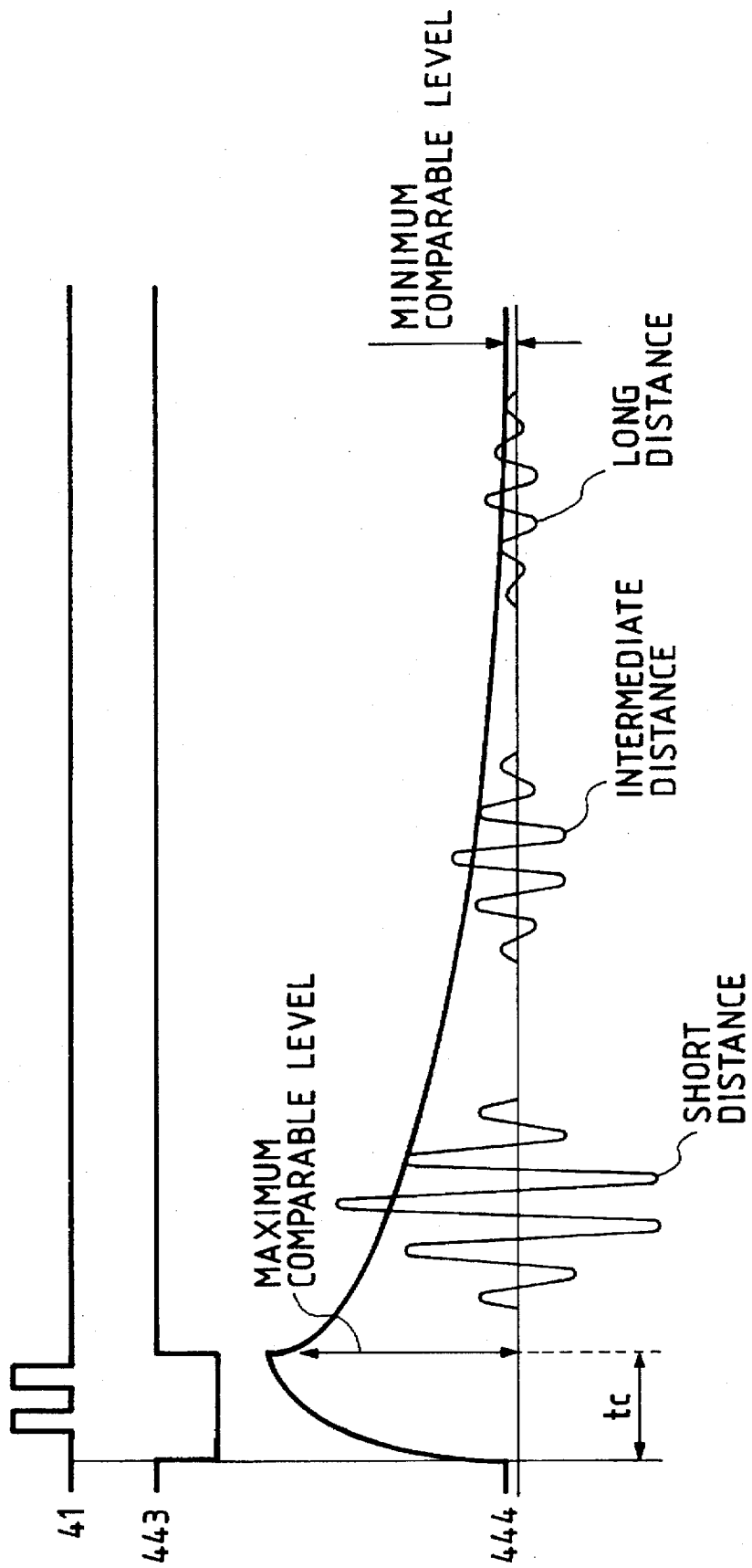
FIG. 12 is an explanatory view of waveform processing based on a variable comparable level.

With the above arrangement, as shown in FIG. 12, a variable CC generation circuit output signal 444, as the reference input, attenuates as time elapses in correspondence with the detected levels from a short distance to a long distance. The following processing is the same as that in the above embodiment, and a detailed description thereof will be omitted.

In this manner, not only the level of the reference light input to the gate signal generation circuit 58 for generating the enabling timing of the gate signal is attenuated in correspondence with attenuation of the detected level in accordance with the propagation distance of a vibration, but also the minimum comparable level is set to be a required level. As a result, the noise level of the circuit can be minimized, and the dynamic range need not be broadened.

With this arrangement, when the pen pressure and the pen angle remain the same, a coordinate input apparatus with a small calculated distance error can be obtained as in FIG. 10.

[Second Modification]

It is difficult to attain an input operation at an identical pen pressure and an identical pen angle in a stroke input operation, such as a character input operation. The detected level largely depends on personal differences. It can be considered that the way of holding a pen and the pen pressure of a single user are almost constant. Thus, FIG. 13 shows a modification obtained by improving the arrangement shown in FIG. 11.

Figure 13:
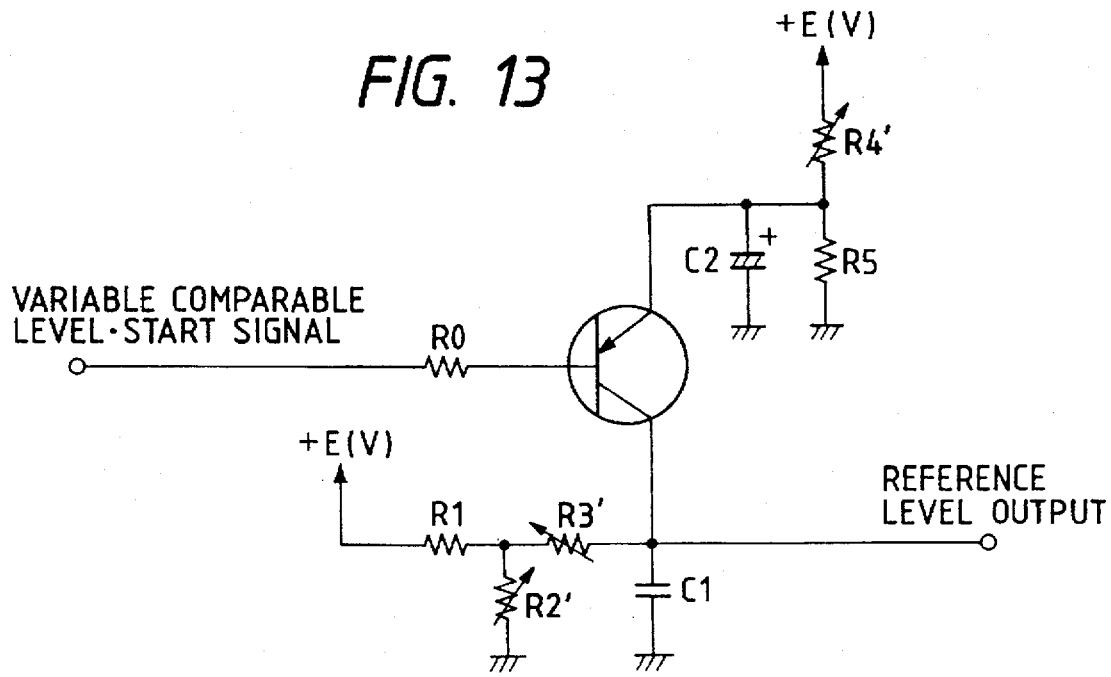
FIG. 13 is a circuit diagram showing the arrangement of a variable comparable level generation circuit according to still another embodiment of the present invention.

In FIG. 13, variable resistors R2', R3', and R4' are used. In this arrangement, the detected level of the apparatus can be adjusted to that of a predetermined user. As has been described with reference to FIG. 11, when the pen pressure is larger than a standard pressure, the value of the resistor R4' is increased to increase the maximum comparable level, and at the same time, the value of the resistor R2' is increased to also increase the minimum comparable level. A change in detected level due to a personal difference can be coped with by only these resistors. In addition, since the variable resistor R3' is used, when the attenuation factor of a vibration increases due to a wear of the vibration transmission plate 8, a physical decrease in the detected level can be coped with by increasing the value of the resistor R3'. A change in detected level due to a personal difference can be sufficiently coped with by only the resistors R2' and R4'. These resistors may be manually adjusted by a user while indicating a predetermined specific point (a point near each sensor and a farthest point, or the like) on the vibration transmission plate 8 and monitoring a distance error. Alternatively, the values of the resistors R2' and R4' may be automatically set by looking up a table which is prepared in advance in the arithmetic control circuit based on the detected levels and the calculated distance errors.

With the above-mentioned arrangement of the comparable level generation circuit, the maximum comparable level, the minimum comparable level, and the attenuation factor can be desirably changed, and the transmission delay times tp and tg can be accurately measured independently of the personal differences of users or the aging of the apparatus, thus allowing an accurate coordinate input operation.

In the arrangement shown in FIG. 13, two circuit constants must be adjusted. Alternatively, a variable capacitor C1 may be adopted (the resistors R2' and R4' are fixed) and the arrangement for adjusting C1 can reduce the number of adjustment points. For this reason, when some expensive and large components, such as a variable capacitor, can be used, the value of the capacitor C1 may be changed.

Figure 20:
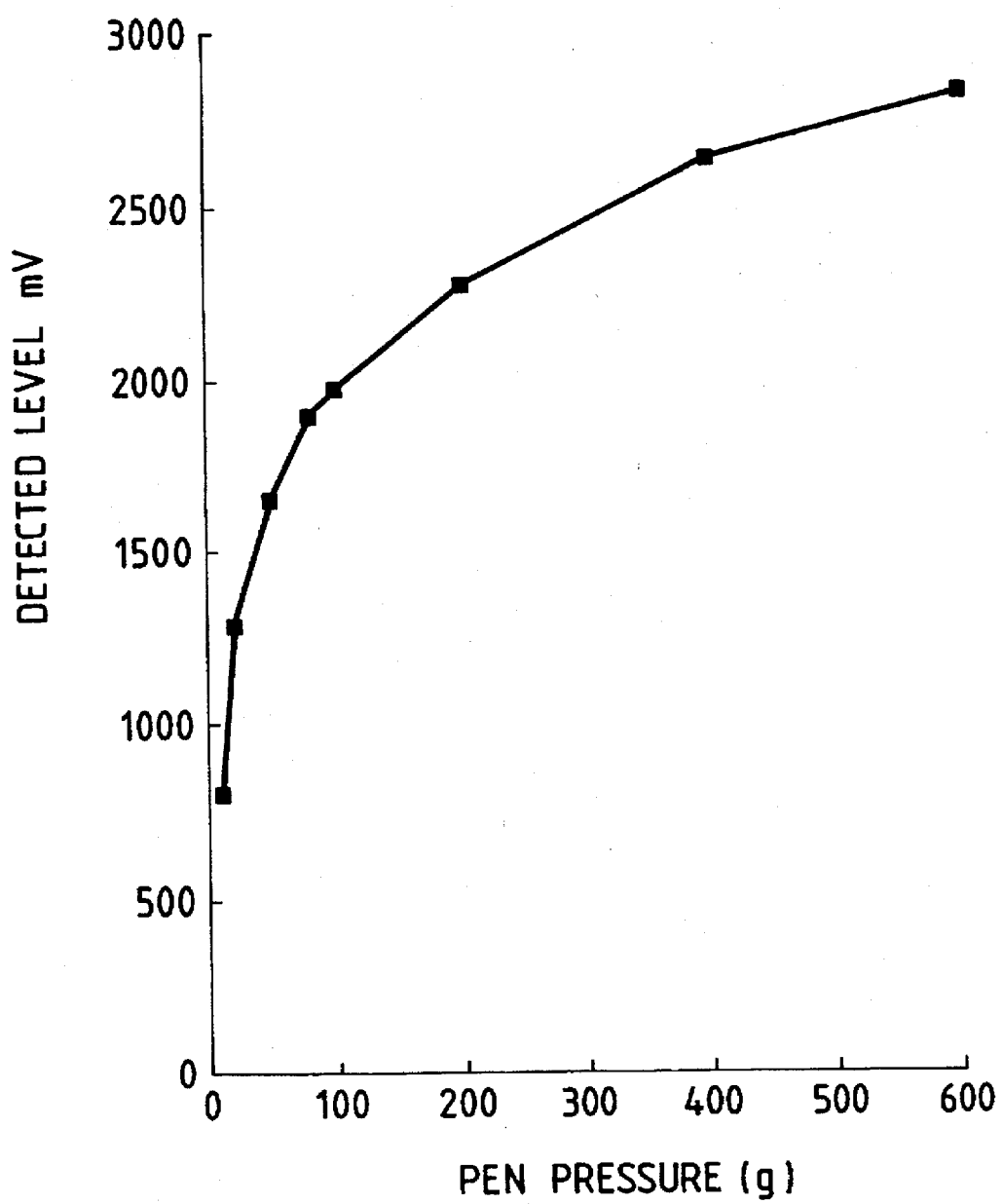
FIG. 20 is a graph showing the relationship between the vibration pen input pen pressure and the detected level.
Figure 21:
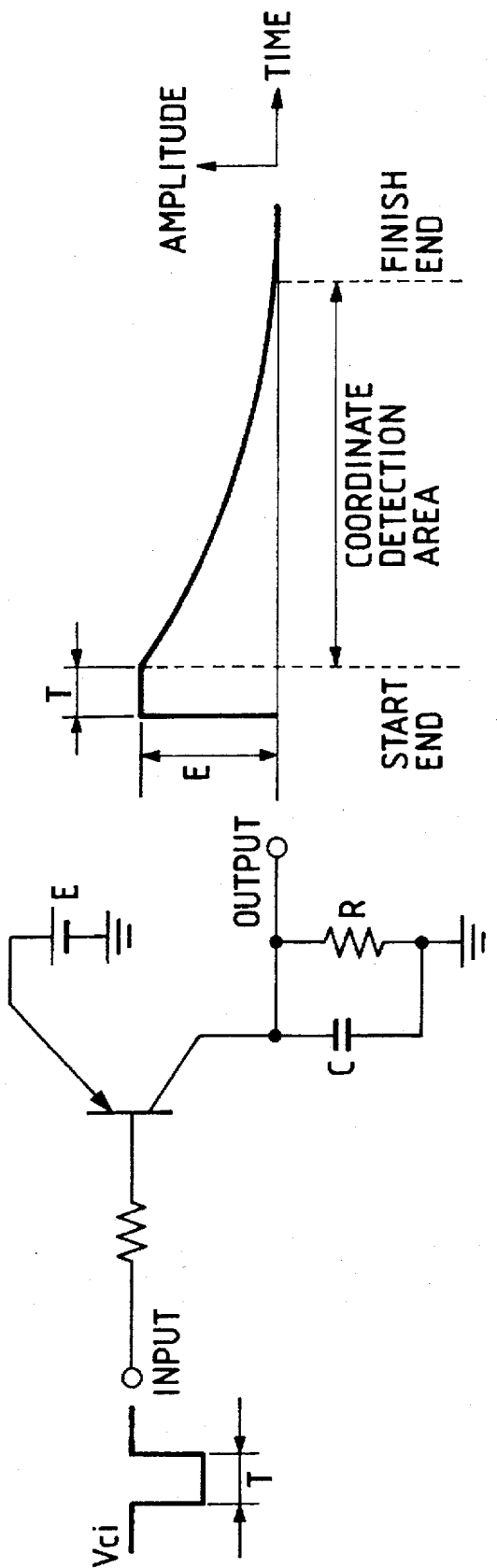
FIG. 21 is a circuit diagram showing the arrangement of a conventional time attenuating threshold value circuit.

The arrangement shown in FIG. 11 in which the comparable level attenuates along with time copes strongly with noise, but does not cope with a variation in level due to a change in pen pressure, as can be seen from FIG. 20. For this reason, a sufficient use condition cannot be satisfied. Therefore, an adjustment mechanism for each user is indispensable.

As described above, a coordinate input apparatus according to the present invention can provide a stable and highly accurate coordinate input operation with a simple arrangement even when a variation in a vibration detected level due to the vibration transmission distance increases, even when the disturbance noise increases due to a use environment of the coordinate input apparatus, or even when the detected level changes due to a change in pen pressure or a change in a way of holding a pen (pen angle).

What is claimed is:

1. A coordinate input apparatus comprising:

a vibration transmission plate;

input means for inputting a vibration onto said vibration transmission plate;

vibration detection means for detecting at a plurality of detection positions an elastic wave vibration input to said vibration transmission plate;

envelope output means for outputting an envelope signal of a detection signal from said vibration detection means;

reference signal generation means for generating a reference signal by attenuating the envelope signal and adding a predetermined offset to the attenuated envelope signal;

base signal generation means for generating a second-order differential signal of the detection signal from said vibration detection means as a base signal;

gate signal generation means for comparing the reference signal and the base signal and generating a gate signal with a predetermined time width from a point where the base signal exceeds the reference signal;

group delay detection means for detecting an inflection point of the envelope signal during a duration of the gate signal, and detecting a group delay time of the vibration with reference to the detected inflection point;

phase delay detection means for detecting a zero cross point in a predetermined order of the envelope signal in the ON duration of the gate signal, and detecting a phase delay time of the vibration with reference to the detected zero cross point; and calculation means for calculating an input coordinate position of said input means on the basis of the group and phase delay times.

2. A coordinate input apparatus comprising:

a vibration transmission plate input means for inputting a vibration onto said vibration transmission plate;

vibration detection means for detecting, at a plurality of detection positions, an elastic wave vibration input to said vibration transmission plate;

reference signal generation means for generating a reference signal whose level increases or decreases in correspondence with a signal level of a detection signal from said vibration detection means;

base signal generation means for generating a base signal with a predetermined waveform on the basis of the detection signal from said vibration detection means;

gate signal generation means for comparing the reference signal and the base signal and generating a gate signal with a predetermined time width from a point where the base signal exceeds the reference signal;

delay detection means for detecting a predetermined point of the envelope signal during a duration of the gate signal, and detecting a delay time of the vibration with reference to the predetermined point; and calculation means for calculating an input coordinate position of said input means on the basis of the delay time.

3. An apparatus according to claim 2, further comprising envelope generation means for generating an envelope of the detection signal, and wherein said reference signal generation means generates the reference signal by attenuating the envelope and adding a predetermined offset amount to the attenuated envelope.

4. An apparatus according to claim 2, wherein said delay detection means detects, as a phase delay time, a time interval from when the vibration is input by said input means until a zero cross point, in a predetermined order of the detection signal in the duration of the gate signal, is detected.

5. An apparatus according to claim 3, wherein said delay detection means detects, as a group delay time, a time interval from when the vibration is input by said input means until an inflection point of the envelope in the duration of the gate signal is detected.

6. An apparatus according to claim 2, wherein said base signal generation means generates a second-order differential signal of the detection signal as the base signal.

7. An apparatus according to claim 2, wherein said base signal generation means generates a predetermined frequency band component signal included in the detection signal as the base signal.

8. A coordinate input apparatus comprising:

a vibration transmission plate for transmitting a vibration;

vibration generation means for generating a vibration at a predetermined period;

vibration detection means for detecting at a plurality of positions on said vibration transmission plate an elastic wave vibration input by said vibration generation means, and outputting a detection signal;

level generation means for generating a level signal which attenuates to substantially match with an attenuation characteristic of the vibration generated by said vibration generation means so that the level signal assumes a maximum value at a generation timing of the vibration by said vibration generation means, and assumes a minimum value not less than a predetermined level after an elapse of a longest vibration transmission time on said vibration transmission plate;

gate signal generation means for generating a gate signal by detecting a portion, which exceeds the level signal, of the detection signal;

measurement means for detecting a predetermined point of the detection signal in a duration of the gate signal, and measuring a delay time of the vibration with reference to the predetermined point; and calculation means for calculating a coordinate position of said vibration generation means on the basis of the delay time measured by said measurement means.

9. An apparatus according to claim 8, wherein said measurement means measures, as a phase delay time, a time interval from when the vibration is input by said vibration generation means until a zero cross point in a predetermined order of the detection signal in the duration of the gate signal is detected.

10. An apparatus according to claim 9, further comprising envelope generation means for generating an envelope of the detection signal, and wherein said measurement means detects, as a group delay time, a time interval from when the vibration is input by said vibration generation means until an inflection point of the envelope in the duration of the gate signal is detected.

11. An apparatus according to claim 8, wherein said measurement means detects a zero cross point of a second-order differential signal of the detection signal as the predetermined point.

12. An apparatus according to claim 8, wherein said measurement means detects a zero cross point of a predetermined frequency band component signal included in the detection signal as the predetermined point.

* * * * *

UNITED STATES PATENT AND TRADEMARK OFFICE
CERTIFICATE OF CORRECTION

PATENT NO.   : 5,684,277
DATED        : November 4, 1997
INVENTOR(S)  : MASAKI TOKIOKA, ET AL.

It is certified that error appears in the above-indentified patent and that said Letters Patent is hereby corrected as shown below:

<u>COLUMN 17</u>

Line 6, "Cc" should read --CC--.

Signed and Sealed this

Twenty-eighth Day of April, 1998

Attest:

BRUCE LEHMAN

*Attesting Officer*   *Commissioner of Patents and Trademarks*